(12) United States Patent
Gotou et al.

(10) Patent No.: US 8,980,408 B2
(45) Date of Patent: Mar. 17, 2015

(54) LIQUID COMPOSITION, RECORDING METHOD, AND RECORDED MATTER

(75) Inventors: Hiroshi Gotou, Kanagawa (JP);
Hidetoshi Fujii, Kanagawa (JP);
Kiyofumi Nagai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/816,278

(22) PCT Filed: Aug. 18, 2011

(86) PCT No.: PCT/JP2011/069101
§ 371 (c)(1),
(2), (4) Date: Feb. 11, 2013

(87) PCT Pub. No.: WO2012/023629
PCT Pub. Date: Feb. 23, 2012

(65) Prior Publication Data
US 2013/0143008 A1    Jun. 6, 2013

(30) Foreign Application Priority Data

Aug. 19, 2010 (JP) ................................. 2010-184212

(51) Int. Cl.
*C09D 179/02* (2006.01)
*C09D 177/00* (2006.01)
*B41M 5/00* (2006.01)
*C08G 73/02* (2006.01)
(Continued)

(52) U.S. Cl.
CPC ............ *C09D 179/02* (2013.01); *B41M 5/0017* (2013.01); *C08G 73/0213* (2013.01); *C08G 73/022* (2013.01); *C08G 73/0286* (2013.01);
*C08G 73/0293* (2013.01); *C08L 79/02* (2013.01); *C09D 11/322* (2013.01); *C09D 11/54* (2013.01); *B41J 2/01* (2013.01); *C09D 177/00* (2013.01)
USPC ........ 428/195.1; 524/300; 524/376; 524/608; 524/612; 427/261

(58) Field of Classification Search
USPC .................................................. 523/160, 161
See application file for complete search history.

(56) References Cited

U.S. PATENT DOCUMENTS 4,093,605 A    6/1978  Hoppe et al.
4,407,994 A   10/1983  Bankert et al.
(Continued)

FOREIGN PATENT DOCUMENTS

CN    1787920 A    6/2006
CN    1956851 A    5/2007
(Continued)

OTHER PUBLICATIONS

Extended Search Report issued Dec. 20, 2013 in European Patent Application No. 11818269.0.
(Continued)

*Primary Examiner* — Vu A Nguyen
(74) *Attorney, Agent, or Firm* — Oblon, McClelland, Maier & Neustadt, L.L.P.

(57) ABSTRACT

A liquid composition containing: a water-soluble cationic polymer obtained by polymerizing monomers containing epihalohydrin and at least one of amine and amide; and water, wherein the liquid composition is for agglutinating negatively charged particles which are dispersed in a dispersion liquid.

18 Claims, 2 Drawing Sheets

(51) Int. Cl.
    *C08L 79/02*     (2006.01)
    *C09D 11/322*     (2014.01)
    *C09D 11/54*     (2014.01)
    *B41J 2/01*     (2006.01)

(56) References Cited

U.S. PATENT DOCUMENTS

| | | |
|---|---|---|
| 4,647,310 A | 3/1987 | Shimada et al. |
| 4,711,668 A | 12/1987 | Shimada et al. |
| 4,793,860 A | 12/1988 | Murakami et al. |
| 4,870,119 A * | 9/1989 | Yee et al. ............... 523/417 |
| 5,431,720 A | 7/1995 | Nagai et al. |
| 5,462,592 A | 10/1995 | Murakami et al. |
| 5,514,208 A | 5/1996 | Nagai et al. |
| 5,622,550 A | 4/1997 | Konishi et al. |
| 5,714,552 A | 2/1998 | Bower |
| 5,810,915 A | 9/1998 | Nagai et al. |
| 5,861,194 A * | 1/1999 | Noguchi et al. ............ 427/386 |
| 5,879,439 A | 3/1999 | Nagai et al. |
| 5,882,390 A | 3/1999 | Nagai et al. |
| 5,972,082 A | 10/1999 | Koyano et al. |
| 5,993,524 A | 11/1999 | Nagai et al. |
| 6,120,589 A | 9/2000 | Bannai et al. |
| 6,231,652 B1 | 5/2001 | Koyano et al. |
| 6,261,349 B1 | 7/2001 | Nagai et al. |
| 6,613,136 B1 | 9/2003 | Arita et al. |
| 6,688,737 B2 | 2/2004 | Nagai et al. |
| 6,918,662 B2 | 7/2005 | Arita et al. |
| 7,094,813 B2 | 8/2006 | Namba et al. |
| 7,278,726 B2 | 10/2007 | Nagai |
| 7,284,851 B2 | 10/2007 | Bannai et al. |
| 7,370,952 B2 | 5/2008 | Inoue et al. |
| 7,682,011 B2 | 3/2010 | Namba et al. |
| 7,699,457 B2 | 4/2010 | Namba et al. |
| 7,810,919 B2 | 10/2010 | Kojima et al. |
| 7,812,068 B2 | 10/2010 | Habashi et al. |
| 7,892,340 B2 | 2/2011 | Namba et al. |
| 7,919,544 B2 | 4/2011 | Matsuyama et al. |
| 7,938,527 B2 | 5/2011 | Ohshima et al. |
| 7,950,793 B2 | 5/2011 | Aruga et al. |
| 2002/0083866 A1 | 7/2002 | Arita et al. |
| 2002/0096085 A1 | 7/2002 | Gotoh et al. |
| 2003/0010252 A1 | 1/2003 | Arita et al. |
| 2003/0038869 A1 | 2/2003 | Kaneko et al. |
| 2003/0064206 A1 | 4/2003 | Koyano et al. |
| 2003/0107632 A1 | 6/2003 | Arita et al. |
| 2005/0007431 A1 | 1/2005 | Koyano et al. |
| 2005/0168552 A1 | 8/2005 | Arita et al. |
| 2006/0176349 A1 | 8/2006 | Nagai et al. |
| 2007/0076075 A1 | 4/2007 | Schmid et al. |
| 2007/0197685 A1 | 8/2007 | Aruga et al. |
| 2008/0233363 A1 | 9/2008 | Goto |
| 2008/0254228 A1 | 10/2008 | Kojima et al. |
| 2008/0273045 A1 | 11/2008 | Morohoshi et al. |
| 2008/0302268 A1 | 12/2008 | Arita et al. |
| 2009/0036641 A1 * | 2/2009 | Lang et al. ............... 528/295 |
| 2009/0098312 A1 | 4/2009 | Goto et al. |
| 2009/0114121 A1 | 5/2009 | Morohoshi et al. |
| 2009/0130313 A1 | 5/2009 | Ohshima et al. |
| 2009/0162569 A1 | 6/2009 | Morohoshi et al. |
| 2009/0176070 A1 | 7/2009 | Goto et al. |
| 2009/0186162 A1 | 7/2009 | Namba et al. |
| 2009/0239044 A1 | 9/2009 | Habashi et al. |
| 2009/0258196 A1 | 10/2009 | Nagashima et al. |
| 2009/0263632 A1 | 10/2009 | Kojima et al. |
| 2009/0291213 A1 | 11/2009 | Ohshima et al. |
| 2010/0003417 A1 | 1/2010 | Arai et al. |
| 2010/0068389 A1 * | 3/2010 | Ohzeki et al. ............... 427/256 |
| 2010/0196601 A1 | 8/2010 | Goto et al. |
| 2010/0196602 A1 | 8/2010 | Koyano et al. |
| 2010/0196603 A1 | 8/2010 | Ohshima et al. |
| 2010/0196673 A1 | 8/2010 | Nagashima et al. |
| 2010/0209611 A1 | 8/2010 | Ohshima et al. |
| 2010/0215855 A1 | 8/2010 | Morohoshi et al. |
| 2010/0245416 A1 | 9/2010 | Ohshima et al. |
| 2010/0271435 A1 | 10/2010 | Kojima et al. |
| 2010/0277541 A1 | 11/2010 | Watanabe et al. |
| 2010/0279035 A1 | 11/2010 | Namba et al. |
| 2010/0295891 A1 | 11/2010 | Goto et al. |
| 2010/0310796 A1 | 12/2010 | Nishiiri et al. |
| 2011/0057981 A1 | 3/2011 | Aruga et al. |
| 2011/0092610 A1 | 4/2011 | Habashi et al. |
| 2011/0216123 A1 | 9/2011 | Tamai et al. |

FOREIGN PATENT DOCUMENTS

| | | |
|---|---|---|
| CN | 100349995 C | 11/2007 |
| GB | 1 201 426 | 8/1970 |
| GB | 1 206 958 | 9/1970 |
| JP | 08-337048 | 12/1996 |
| JP | 09-104167 | 4/1997 |
| JP | 9-250096 A | 9/1997 |
| JP | 2000-001046 | 1/2000 |
| JP | 2000-053765 | 2/2000 |
| JP | 2000-280607 | 10/2000 |
| JP | 3206797 | 7/2001 |
| JP | 2001-270227 | 10/2001 |
| JP | 2004-034668 | 2/2004 |
| JP | 2005-154767 | 6/2005 |
| JP | 2009-509822 | 3/2009 |
| JP | 2010-013505 | 1/2010 |
| JP | 2010-076227 | 4/2010 |
| JP | 2010-094830 | 4/2010 |
| JP | 2010-275377 | 12/2010 |
| WO | WO 2009/066662 A1 | 5/2009 |

OTHER PUBLICATIONS

International Search Report Issued Nov. 22, 2011 in PCT/JP11/69101 Filed Aug. 18, 2011.

U.S. Appl. No. 08/638,636, filed Apr. 26, 1996, Nagai, et al.

Combined Office Action and Search Report issued Jan. 23, 2014 in Chinese Patent Application No. 201180039991.9 with English language translation.

* cited by examiner

LIQUID COMPOSITION, RECORDING METHOD, AND RECORDED MATTER

TECHNICAL FIELD

The present invention relates to a liquid composition for agglutinating negatively charged particles, a recording method using the liquid composition and a recorded matter recorded by the recording method.

BACKGROUND ART

In recent years, in accordance with demands for recording a color image at cheap cost, inkjet recording methods, in which a plurality of different color inks are applied to a recording medium having no coating layer, such as plain paper, to thereby record an image on the recording medium, are used. In this case, since the inks are provided to the recording medium having no coating layer, the inks are directly absorbed into paper serving as the base of the recording medium, and ink bleeding occurs. Thus quality of a resulting recorded matter easily degrades.

Then, it can be considered that an image is recorded using an ink having low permeability to prevent the ink from penetrating through the recording medium and to thereby prevent bleeding (referred to as "feathering" hereinbelow) at a boundary portion between the recording medium and the ink in the recorded matter. However, in this case, the ink easily retains on a surface of the recording medium, and accordingly, the drying properties of the recorded matter degrades. When the drying properties of a recorded matter degrades, a finger or the like comes into contact with an ink that has not yet been dried to cause smear on images, and in the case where a color image is recorded, a different color ink is attached to the ink that has not yet been dried, and the color inks are mixed, causing bleeding (referred to as "color bleeding" hereinbelow) at a boundary portion between these inks. Meanwhile, when an ink having high permeability is used to prevent the occurrence of color bleeding, there is a problem that the above-noted feathering occurs and the quality of a resulting recorded matter degrades.

To simultaneously solve these problems, there has been proposed a recording method using an ink and a liquid composition for fixing the ink on a recording medium. For example, there has been proposed an inkjet recording method in which a reaction liquid containing polyallylamine and an ink composition which contains a colorant and a resin emulsion are made adhere to a surface of a recording medium to thereby perform recording (see PTL 1). According to this proposal, print bleeding and printing nonuniformity can be reduced on a recording medium, and moreover color bleeding can be effectively prevented thereon.

CITATION LIST

Patent Literature

PTL 1 Japanese Patent (JP-B) No. 3206797

SUMMARY OF INVENTION

Technical Problem

However, the recording method of this proposal has a problem in terms of fixability of the ink composition on a recording medium. In other words, when the ink composition is made to adhere to a surface of the recording medium on which the liquid composition has been made to adhere, the pigment and the resin emulsion contained in the ink come into contact with polyallylamine which is positively charged, and rapidly agglutinate, and thus aggregates containing a small amount of vehicle (which means a liquid component in the reaction liquid or the ink composition) are accumulated on the outermost surface of the recording medium. The accumulated layer is weak in resistance to abrasion (referred to as "abrasion resistance" hereinbelow), and therefore, such a problem occurs that user's hand may be smeared with the ink when being in contact with a recorded matter, or the rear surface of a recorded matter may be smeared with the ink when being in contact with another recorded matter. In addition, after an image recorded by this inkjet recording method was analyzed, it was found that the diameter of each dot recorded was small. It is considered that this may be caused because the reaction liquid has a strong effect to cause the ink to agglutinate. When the diameter of each dot is excessively small, there is a problem that white-out (which means portions where no ink adheres in a recorded solid image) occur.

The present invention solves the conventional problems and achieves the following object. That is, the present invention aims to provide a liquid composition, which can form an image with high density on a recording medium, can effectively prevent occurrence of strikethrough, feathering, and color bleeding, can decrease occurrence of white-out, gives excellent abrasion resistance to resulting images, and has excellent drying properties and coatability, provide a recording method using the liquid composition, and provide a recorded matter recorded by the recording method.

Solution to Problem

Means for solving the problems are as follows.
<1> A liquid composition containing: a water-soluble cationic polymer obtained by polymerizing monomers containing epihalohydrin and at least one of amine and amide; and water, wherein the liquid composition is for agglutinating negatively charged particles which are dispersed in a dispersion liquid.
<7> A recording method including making the liquid composition according to <1> adhere onto a recording medium; and making a dispersion liquid, in which negatively charged and colorant-containing particles which are dispersed, adhere onto the recording medium onto which the liquid composition has been made to adhere.
<9> A recorded matter containing: an image, wherein the image is recorded by the recording method according to <7>.

Advantageous Effects of Invention

When a dispersion liquid, in which negatively charged particles are dispersed, is applied to a recording medium to which a liquid composition of the present invention has been made to adhere, a dispersion medium contained in the dispersion liquid is diffused by the action of a water-soluble cationic polymer contained in the liquid composition, and at the same time, the particles contained therein agglutinate. With the occurrence of diffusion of the dispersion medium and agglutination of the particles, the colorant is fixed at a shallow portion inside the recording medium, to thereby obtain a recorded matter having excellent fixability.

The present invention solves the conventional problems and achieves the following object. That is, the present invention aims to provide a liquid composition, which can form an image with high density on a recording medium, can effectively prevent occurrence of strikethrough, feathering, and color bleeding, can decrease occurrence of white-out, gives excellent abrasion resistance to resulting images, and has excellent drying properties and coatability, provide a recording method using the liquid composition, and provide a recorded matter recorded by the recording method.

DESCRIPTION OF EMBODIMENTS (Liquid Composition)

A liquid composition of the present invention is a liquid composition for agglutinating negatively charged particles, which are dispersed in a dispersion liquid, the liquid composition containing water, and a water-soluble cationic polymer obtained by polymerizing a monomer containing epihalohydrin and at least one of amine and amide, and if necessary further containing other components such as organic acid ammonium salt.

Figure 1A:
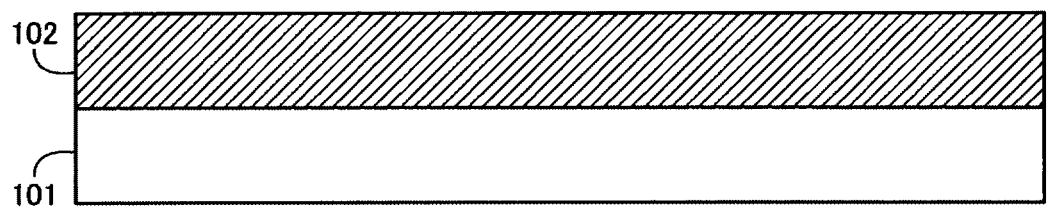
FIGS. 1A to 1C are schematic cross-sectional views each illustrating a state of a recorded portion in a recorded matter of the present embodiment.
Figure 1B:
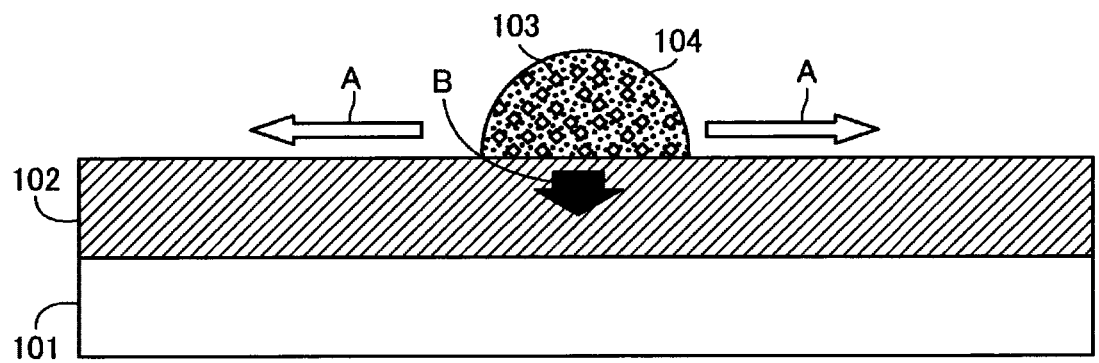
Figure 1C:
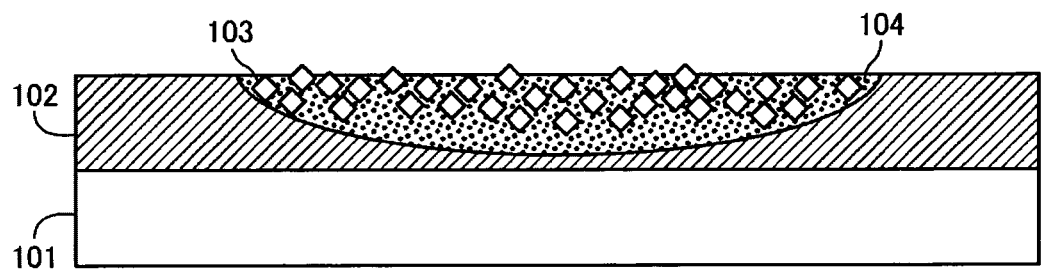

Hereinafter, with reference to preferred embodiments, the liquid composition of the present embodiment will be further described in detail. An expected mechanism of fixation of a dispersion liquid using the liquid composition of the present invention is described using FIGS. 1A to 1C. Here, the dispersion liquid is an ink, in which negatively charged and colorant-containing particles which are dispersed. FIGS. 1A to 1C are schematic cross-sectional views for each describing a state of a recorded portion in a recorded matter of the present embodiment.

When the liquid composition of the present embodiment is applied to a recording medium 101 made of a paper body, a liquid composition-attached portion 102 is formed on the recording medium 101 (see FIG. 1A). To the liquid composition-attached portion 102, an ink, in which negatively charged and colorant-containing particles 103 are dispersed in a dispersion medium 104 (hereinafter referred to as a "vehicle"), is applied. Examples of the negatively charged and colorant-containing particles 103 include colorant particles having a negative charge, and particles containing a colorant and a compound having a negative charge.

In the case where an ink is applied onto the liquid composition-attached portion 102, the ink is in contact with the liquid composition contained in liquid composition-attached portion 102 (see FIG. 1B). In this case, a water-soluble cationic polymer contained in the liquid composition acts so that the concentration of hydrogen ions (pH) and metal ions do not greatly vary (buffering action). For this reason, the followings can be prevented: the colorant contained in the ink sharply agglutinates due to an acid and/or base reaction and/or a large amount of the colorant precipitates on the recording medium. As a result, the ink spread on the surface of the recording medium (the direction of arrow A in FIG. 1B), the area of dots recorded is increased, to thereby increase the density of an image (which includes characters, symbols etc.).

Subsequently, when an ink penetrates into the liquid composition-attached portion 102 of the recording medium 101 (the direction of arrow B in FIG. 1B), a colorant contained in the ink agglutinate by the action of the water-soluble cationic polymer, and is fixed on the recording medium (see FIG. 1C). It is inferred that the colorant is fixed at a shallow position inside the recording medium in this way, thereby improving the fixability, and reducing the occurrence of feathering and color bleeding.

It is desired that the liquid composition of the present embodiment be quickly absorbed into a recording medium after being applied to the recording medium. In the present embodiment, "dry", "drying" or "dried", etc. means a state that the liquid composition is absorbed into the recording medium. In order to quickly dry the liquid composition, the surface tension of the liquid composition is preferably 30 mN/m or lower. Note that it is enough for the liquid composition to be dried after being applied to the recording medium, and there is no need that a liquid such as water contained in the vehicle be vaporized to be unable to keep the liquid state, and the dried liquid composition allows to fix the ink and to improve the quality of an image to be recorded. In the present embodiment, "solidification", "solidify" or "solidified", etc. means a state that a liquid such as water contained in the vehicle is vaporized to be unable to keep the liquid state. Next, components, for example, the water-soluble cationic polymer, contained the liquid composition of the present embodiment will be described hereinbelow.

<Water-Soluble Cationic Polymer>

As the water-soluble cationic polymer used in the liquid composition of the present embodiment, a water-soluble cationic polymer obtained by polymerizing a monomer containing epihalohydrin and at least one of amine and amide is used. The water-soluble cationic polymer obtained by polymerizing such monomer contains a hydroxyl group and ammonium cation, etc. in a main chain. It is inferred that when the water-soluble cationic polymer is in contact with an ink, the water-soluble cationic polymer has a function of enhancing the buffering action and the action of agglutinating a colorant as halogen anions contained in the water-soluble cationic polymer is isolated into an aqueous solution of the water-soluble cationic polymer.

The water-soluble cationic polymer is not particularly limited and may be suitably selected in accordance with the intended use. Suitable examples thereof include a polyamine-epihalohydrin copolymer, a polyamide-epihalohydrin copolymer, a polyamidepolyamine-epihalohydrin copolymer, an amine-epihalohydrin copolymer. Among these, at least one selected from a copolymer represented by Formula (1), a copolymer having a repeating unit represented by Formula (2), and a copolymer obtained by polymerizing an amine monomer, a monomer represented by Formula (4) and a monomer represented by Formula (5) is more preferable. Examples of the amine monomer include diethylenetriamine, triethylenetetramine, and tetraethylenepentamine, and iminobispropylamine. The monomer represented by Formula (3) is preferable, because it is industrially produced and easily obtainable. Note that as the above-described water-soluble cationic polymer, other than the above exemplary compounds, a quaternary ammonium salt type cationic polymer, or in some cases a water-dispersible cationic polymer may be used.

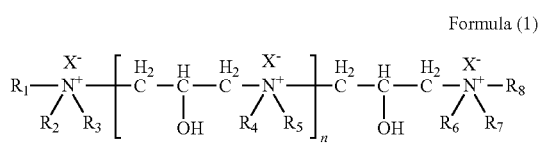

Formula (1)

in Formula (1), $R_1$ to $R_8$ may be identical to or different from each other, and each denote at least one of an alkyl group having 1 to 8 carbon atoms, a hydroxyalkyl group, an alkenyl group, and a benzyl group, X denotes a halogen atom (for example, F, Cl, Br, I), n denotes an integer of 1 or 2.

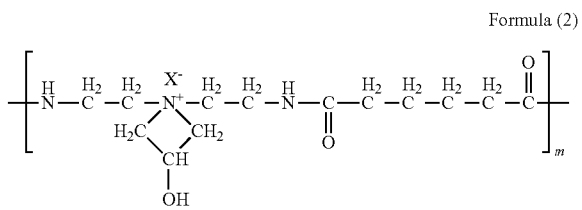

Formula (2)

in Formula (2), X denotes a halogen atom (for example, F, Cl, Br, I), and m denotes an integer of 1 or more. Both-terminal of the copolymer represented by Formula (2) may be a monomer constituting a repeating unit, a known initiator, or the like.

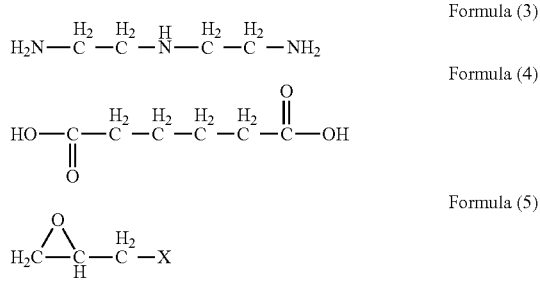

Formula (3)

Formula (4)

Formula (5)

in Formula (5), X denotes a halogen atom (for example, F, Cl, Br, and I).

The water-soluble cationic polymer is obtained by known methods such as a method for polymerizing a monomer containing epihalohydrin and at least one of amine and amide, a method for graft polymerization of a monomer containing epihalohydrin with polyamide which is obtained by polymerizing a monomer containing amine and carboxylic acid.

The weight average molecular weight of the water-soluble cationic polymer differs depending on types of copolymers. In the case of the polyamine-epihalohydrin copolymer, the weight average molecular weight of the water-soluble cationic polymer is preferably 500 to 100,000. In the case of the polyamide-epihalohydrin copolymer or the polyamide-polyamine-epihalohydrin copolymer, the weight average molecular weight of the water-soluble cationic polymer is preferably 5,000,000 or less. In the case of the polyamine-epihalohydrin copolymer, the weight average molecular weight of the water-soluble cationic polymer is preferably 700 to 50,000. When the weight average molecular weight is more than the maximum value of each copolymer, an aqueous solution may not be formed. When the weight average molecular weight is less than the minimum value of each copolymer, effect of treatment with the liquid composition may be decreased.

The addition amount of the water-soluble cationic polymer is not particularly limited and may be suitably selected in accordance with the intended use. The addition amount of the water-soluble cationic polymer is preferably 1% by mass to 40% by mass, and more preferably 3% by mass to 30% by mass, relative to the total amount of the liquid composition of the present embodiment. When the addition amount is more than 40% by mass, the effect of improving the quality of an image in commensurate with the increased addition amount may not change, and the viscosity of the liquid composition may excessively increase. When the addition amount is less than 1% by mass, there is a possibility that the effect of improving the quality of an image is reduced.

<Organic Acid Ammonium Salt>

The liquid composition of the present embodiment preferably contains an organic acid ammonium salt, in order to improve quality of an image to be formed.

The organic acid ammonium is not particularly limited and may be suitably selected in accordance with the intended use. From the standpoint of solubility to water, ammonium lactate, ammonium acetate, ammonium propionate, ammonium citrate, ammonium tartrate, ammonium succinate (diammonium succinate), diammonium malonate, diammonium hydrogen citrate, triammonium citrate, and ammonium L-glutamate are preferable, with more preference given to ammonium lactate.

The addition amount of the organic acid ammonium salt is not particularly limited and may be suitably selected in accordance with the intended use. It is preferably 1% by mass to 40% by mass, more preferably 3% by mass to 30% by mass, relative to the liquid composition. When the addition amount is more than 40% by mass, the quality of an image in commensurate with the increased addition amount may not be improved, and the viscosity of the liquid composition may excessively increase. When the addition amount is less than 1% by mass, there is a possibility that the effect of improving the quality of an image is reduced.

<Water-Soluble Organic Solvent>

The water-soluble organic solvent for use in the liquid composition of the present embodiment is used for retaining water contained in the liquid composition. With use of the water-soluble organic solvent, an increase in viscosity of the liquid composition can be suppressed and the discharge stability can be maintained, even when water or the like in the liquid composition vaporizes in a nozzle for providing thereof or in a coater. For this reason, as the water-soluble organic solvent, it is preferable to use a water-soluble organic solvent having high-equilibrium water content. Here, the equilibrium water content means a water content when a mixture of a water-soluble organic solvent and water is released in the air at a constant temperature and a constant humidity, the evaporation of water in the solution and the absorption of water in the air into the ink is in an equilibrium condition. In the present embodiment, the water content equilibrium is determined as follows: a petri dish in which the water-soluble organic solvent is weighed in an amount of 1 g is stored for a period until the mass thereof does not change, in a desiccator in which the temperature and humidity are maintained at 23° C.±1° C. and 80%±3% using a saturated potassium chloride aqueous liquid, and the water content equilibrium is determined by the following equation.

Equilibrium Water Content (% by mass)=(Amount of water absorbed into water-soluble organic solvent)/(Amount of water-soluble organic solvent+ Amount of water absorbed into water-soluble organic solvent)×100

The water-soluble organic solvent is not particularly limited and may be suitably selected in accordance with the intended use. Examples thereof include polyhydric alcohols, polyhydric alcohol alkyl ethers, polyhydric alcohol aryl ethers, nitrogen-containing heterocyclic compounds, amides, amines, sulfur-containing compounds, propylene carbonate, and ethylene carbonate. Among these, a water-soluble organic solvent having an equilibrium water content of 30% by mass or more under the environment of 23° C. and 80% RH is preferable, and a water-soluble organic solvent having such an equilibrium water content of 40% by mass or more under the environment of 23° C. and 80% RH is more preferable (which is referred to as "water-soluble organic solvent A", hereinbelow).

As the water-soluble organic solvent A, polyhydric alcohols are preferably used. Specific examples thereof include 1,2,3-butanetriol (boiling point (hereinafter abbreviated as bp) 175° C./atmospheric pressure at which the boiling point is measured (described only when the atmospheric pressure is not 1 hPa) 33 hPa; equilibrium water content: 38% by mass), 1,2,4-butanetriol (bp: 190° C. to 191° C./24 hPa; 41% by mass), glycerin (bp: 290° C.; 49% by mass), diglycerin (bp: 270° C./20 hPa; 38% by mass), triethylene glycol (bp: 285° C.; 39% by mass), tetraethylene glycol (bp: 324° C. to 330° C.; 37% by mass), diethylene glycol (bp: 245° C.; 43% by mass), 1,3-butanediol (bp: 203° C. to 204° C.; 35% by mass). Among these, glycerin, and 1,3-butanediol are particularly preferably used because they show a low viscosity when they contain water and can be stably maintained without causing the colorant to agglutinate. When the water-soluble organic solvent A is used in an amount of 50% by mass relative to the total amount of water-soluble organic solvents, it is preferable in that the discharge stability of the liquid composition can be improved, and fixing of the liquid composition in a recording apparatus can be prevented.

In the liquid composition of the present embodiment, a water-soluble organic solvent having an equilibrium water content of less than 30% by mass at 23° C. and 80% RH (which is referred to as "water-soluble organic solvent B" hereinbelow) may be used instead of the water-soluble organic solvent A or in addition to the water-soluble organic solvent A. Examples of the water-soluble organic solvent B include polyhydric alcohols, polyhydric alcohol alkyl ethers, polyhydric alcohol aryl ethers, nitrogen-containing heterocyclic compounds, amides, amines, sulfur-containing compounds, propylene carbonate, ethylene carbonate, and other water-soluble organic solvents.

Specific examples of the polyhydric alcohols for the water-soluble organic solvent B include dipropylene glycol (bp: 232° C.), 1,5-pentanediol (bp: 242° C.), 3-methyl-1,3-butanediol (bp: 203° C.), propylene glycol (bp: 187° C.), 2-methyl-2,4-pentanediol (bp: 197° C.), ethylene glycol (bp: 196° C. to 198° C.), tripropylene glycol (bp: 267° C.), hexylene glycol (bp: 197° C.), polyethylene glycol (viscosity-adjusted liquid to solid), polypropylene glycol (bp: 187° C.), 1,6-hexanediol (bp: 253° C. to 260° C.), 1,2,6-hexanetriol (bp: 178° C.), trimethylol ethane (solid, melting point (hereinafter abbreviated as mp): 199° C. to 201° C.), and trimethylol propane (solid, mp: 61° C.).

Examples of the polyhydric alcohol alkyl ethers for the water-soluble organic solvent B include ethylene glycol monoethyl ether (bp: 135° C.), ethylene glycol monobutyl ether (bp: 171° C.), diethylene glycol monomethyl ether (bp: 194° C.), diethylene glycol monoethyl ether (bp: 197° C.), diethylene glycol monobutyl ether (bp: 231° C.), ethylene glycol mono-2-ethylhexyl ether (bp: 229° C.), and propylene glycol monoethyl ether (bp: 132° C.).

Examples of the polyhydric alcohol aryl ethers for the water-soluble organic solvent B include ethylene glycol monophenyl ether (bp: 237° C.), and ethylene glycol monobenzyl ether.

Examples of the nitrogen-containing heterocyclic compound for the water-soluble organic solvent B include 2-pyrrolidone (bp: 250° C., mp: 25.5° C., 47% by mass to 48% by mass), N-methyl-2-pyrrolidone (bp: 202° C.), 1,3-dimethyl-2-imidazolidinone (bp: 226° C.), ε-caprolactam (bp: 270° C.), and γ-butylolactone (bp: 204° C. to 205° C.).

Examples of the amides for the water-soluble organic solvent B include formamide (bp: 210° C.), N-methylformamide (bp: 199° C. to 201° C.), N,N-dimethylformamide (bp: 153° C.), and N,N-diethylformamide (bp: 176° C. to 177° C.).

Examples of the amines for the water-soluble organic solvent B include monoethanolamine (bp: 170° C.), diethanolamine (bp: 268° C.), triethanolamine (bp: 360° C.), N,N-dimethylmonoethanolamine (bp: 139° C.), N-methyldiethanolamine (bp: 243° C.), N-methylethanolamine (bp: 159° C.), N-phenylethanolamine (bp: 282° C. to 287° C.), and 3-aminopropyldiethylamine (bp: 169° C.).

Examples of the sulfur-containing compounds for the water-soluble organic solvent B include dimethylsulfoxide (bp: 139° C.), sulfolane (bp: 285° C.), and thiodiglycol (bp: 282° C.).

As for the other solid water-soluble organic solvents for the water-soluble organic solvent B, sugar and the like are preferable.

Examples of the sugar include monosaccharides, disaccharides, oligosaccharides (including trisaccharides, and tetrasaccharides), and polysaccharides. Specific examples of the sugar include glucose, mannose, fructose, ribose, xylose, arabinose, galactose, maltose, cellobiose, lactose, sucrose, trehalose, and malttriose. Here, the term "polysaccharides" means a saccharide in a broad sense, and is used herein it encompasses substances which are broadly present in nature such as α-cyclodextrin, and cellulose. In addition, as derivatives of these sugars, there may be exemplified reducing sugars of the above-mentioned sugars (e.g., sugar alcohol represented by Formula: $HOCH_2(CHOH)_nCH_2OH$ (where n denotes an integer of 2 to 5), acid sugar (e.g., aldonic acid, and uronic acid), amino acid, and thio acid. Among these, sugar alcohol is preferable. Specific examples of the sugar alcohol include maltitol, and sorbitol.

The amount of the water-soluble organic solvent contained in the liquid composition is not particularly limited. It is usually 10% by mass to 80% by mass, and more preferably 15% by mass to 60% by mass. When the amount of the water-soluble organic solvent is more than 80% by mass, there is a probability that the drying properties of a recording medium to which the liquid composition has been made to adhere degrades, depending on the types of the water-soluble organic solvents. When the amount of the water-soluble organic solvent is less than 10% by mass, water contained in the liquid composition easily vaporizes, and the viscosity of the liquid composition is increased as vaporization proceeds, which may lead to a failure in the coating step.

<Other Components>

Next, other components to be added to the liquid composition of the present embodiment will be described. The liquid composition of the present embodiment contains may further contain a surfactant, a penetrant, an anti-foaming agent, and the like, in addition to the above-described components.

<<Surfactant>>

The liquid composition of the present embodiment may contain a surfactant for improving the wetting properties of a recording medium; the image density and color saturation of a recorded matter, preventing white-out (this means that blank portions remain in image portions of a recorded matter), and for causing a vehicle in an ink quickly penetrate into a recording medium to thereby improve the fixability. In this case, the amount of the surfactant is preferably 0.001% by mass to 5% by mass, and more preferably 0.05% by mass to 2% by mass, relative to the total amount of the liquid composition. When the amount of the surfactant is less than 0.001% by mass, the effect of adding the surfactant may be reduced, and when it is more than 5% by mass, it may make no difference in effect obtained by increasing the addition amount thereof.

The surfactant is not particularly limited and may be suitably selected in accordance with the intended use. Examples of the surfactant include fluorine-based surfactants, silicone-based surfactants, nonionic surfactants, anionic surfactants, and betaine-based surfactants. Fluorine-based surfactants are particularly preferred. These surfactants may be used alone or in combination.

In addition, as the fluorine-based surfactant, a fluorine-based surfactant having 2 to 16 carbon atoms substituted with fluorine is preferable, and a fluorine-based surfactant having 4 to 16 such carbon atoms is more preferable. When the number of carbon atoms substituted with fluorine is less than 2, the effect of using the fluorine-based surfactant may not be obtained, and when it is more than 16, it may cause a problem with storage stability.

The fluorine-based surfactant is not particularly limited and may be suitably selected in accordance with the intended use. Examples thereof include a perfluoroalkyl sulfonic acid compound, a perfluoroalkyl carboxylic acid compound, a perfluoroalkyl phosphate ester compound, a perfluoroalkyl-ethylene oxide adduct, and a polyoxyalkylene ether polymer compound having a perfluoroalkyl ether group in the side chain. Among these, a fluorine-based surfactant having a perfluoroalkyl group is preferable. A fluorine-based surfactant represented by the following Formulae (F-1) to (F-4) is particularly preferable.

$$C_nF_{2n+1}-CH_2CH(OH)CH_2O-(CH_2CH_2O)_a-Y' \quad \text{Formula (F-1)}$$

in Formula (F-1), n denotes an integer of 2 to 6; "a" denotes an integer of 15 to 50, and Y' denotes $-C_bH_{2b+1}$ (b denotes an integer of 11 to 19) or $-CH_2CH(OH)CH_2-C_dF_{2d+1}$ (d denotes an integer of 2 to 6).

$$CF_3CF_2(CF_2CF_2)_j-CH_2CH_2O-(CH_2CH_2O)_kH \quad \text{Formula (F-2)}$$

in Formula (F-2), j denotes an integer of 0 to 10, and k denotes an integer of 0 to 40.

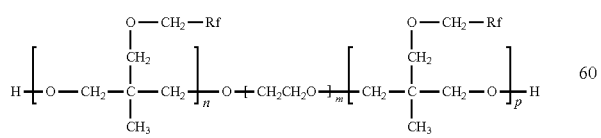

Formula (F-3)

in Formula (F-3), Rf denotes a perfluoroalkyl group; m denotes an integer of 6 to 25; and n and p each denote an integer of 1 to 4.

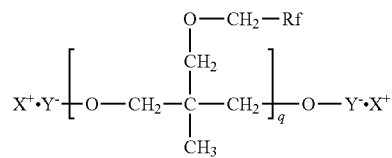

Formula (F-4)

in Formula (F-4), Rf denotes a perfluoroalkyl group; X denotes a quaternary ammonium group; an alkali metal such as sodium and potassium; triethylamine, or triethanolamine; Y denotes $-COO^-$, $-SO_3^-$, $-SO_4^-$, or $-PO_4^-$; and q denotes an integer of 1 to 6.

Preferred examples of a compound represented by Formula (F-1) are compounds each represented by any one of the following structural formulae a) to u), for their high-ability to reduce a surface tension and their high permeability. Among these, compounds represented by e), f), s), t) or u) are preferable because of their excellence in compatibility with an anti-foaming agent represented by the formula (6) below.

a) $C_4F_9-COO-(CH_2CH_2O)_{23}-C_{12}H_{25}$ b) $C_4F_9-SO_2N(CH_3)-(CH_2CH_2O)_{21}-C_{12}H_{25}$ c) $C_4F_9-CH_2CH_2O-CH_2CH_2O)_{25}-C_{12}H_{25}$ d) $H(CF_2)_4-CH_2OCH_2CH(OH)CH_2O-(CH_2CH_2O)_{21}-C_{14}H_{29}$ e) $C_4F_9-CH_2CH(OH)CH_2O-(CH_2CH_2O)_{21}-C_{12}H_{25}$ f) $C_4F_9-CH_2CH(OH)CH_2O-(CH_2CH_2O)_{25}-C_{12}H_{25}$ g) $C_4F_9-CH_2CH(OH)CH_2O-(CH_2CH_2O)_{30}-C_{12}H_{25}$ h) $C_4F_9-CH_2CH(OH)CH_2O-(CH_2CH_2O)_{20}-C_{14}H_{29}$ i) $C_4F_9-CH_2CH(OH)CH_2O-(CH_2CH_2O)_{30}-C_{14}H_{29}$ j) $C_4F_9-CH_2CH(OH)CH_2O-(CH_2CH_2O)_{23}-C_{16}H_{33}$ k) $C_4F_9-CH_2CH(OH)CH_2O-(CH_2CH_2O)_{20}-C_{16}H_{33}$ l) $C_4F_9-CH_2CH(OH)CH_2O-(CH_2CH_2O)_{25}-C_{16}H_{33}$ m) $C_4F_9-CH_2CH(OH)CH_2O-(CH_2CH_2O)_{30}-C_{16}H_{33}$ n) $C_4F_9-CH_2CH(OH)CH_2O-(CH_2CH_2O)_{40}-C_{16}H_{33}$ o) $C_4F_9-CH_2CH(OH)CH_2O-(CH_2CH_2O)_{20}-C_{18}H_{37}$ q) $C_4F_9-CH_2CH(OH)CH_2O-(CH_2CH_2O)_{30}-C_{18}H_{37}$ r) $C_4F_9-CH_2CH(OH)CH_2O-(CH_2CH_2O)_{40}-C_{18}H_{37}$ s) $C_4F_9-CH_2CH(OH)CH_2O-(CH_2CH_2O)_{23}-CH_2CH(OH)CH_2-C_4F_9$ t) $C_4F_9$—$CH_2CH(OH)CH_2O$—$(CH_2CH_2O)_{35}CH_2CH(OH)CH_2$—$C_4F_9$ u) $C_4F_9$—$CH_2CH(OH)CH_2O$—$(CH_2CH_2O)_{45}$—$CH_2CH(OH)CH_2$—$C_4F_9$

In a compound represented by Formula (F-1) above, a (Hydrophile-Lipophile Balance) value determined by Griffin's method is preferably 10 to 16 for the reason of the solubility in an aqueous ink. In addition, in the compound represented by Formula (F-1), a ratio MWEO/MWF of a molecular weight (MWEO) of a polyoxyethylene group [$(CH_2CH_2O)_a$ portion] to a molecular weight (MWF) of a fluoroalkyl group ($C_nF_{2n+1}$ portion and $C_mF_{2m+1}$ portion) is preferably 2.2 to 10 for the reason of balance between the functionality as a surfactant and the solubility in water.

In a compound represented by Formula (F-2) above, j is preferably an integer of 0 to 10, and k is preferably an integer of 0 to 40, in order to improve ability to reduce a surface tension and improve high permeability. As for the compound represented by (F-2) above, a commercially available fluorine-based surfactant can be used. Examples of such commercially available surfactant include SURFRON S-111, S-112, S-113, S-121, S-131, S-132, S-141, and S-145 (produced by Asahi Glass Co.); FLUORAD FC-93, FC-95, FC-98, FC-129, FC-135, FC-170C, FC-430, FC-431, and FC-4430 (produced by Sumitomo 3M Ltd.); MEGAFACE F-470, F-1405, and F-474 (produced by Dainippon Ink and Chemicals, Inc.); ZONYL FS-300, FSN, FSN-100, and FSO (produced by DuPont); EFTOP EF-351, EF-352, EF-801, and EF-802 (produced by Mitsubishi Materials Electronic Chemicals Co., Ltd.). Among these products, ZONYL FS-300, FSN, FSN-100, and FSO (produced by DuPont) are particularly preferable for their high reliability and excellence in color saturation. These commercially products are each a mixture of compounds having several kinds of molecular weights, and in most case, j and k in Formula (F-2) have a distribution, however, in the present embodiment, these commercially available products can be used without any problems.

In a compound represented by Formula (F-3) above, as Rf, a perfluoroalkyl group is preferably used in order to improve ability to reduce a surface tension and improve high permeability. As for the perfluoroalkyl group, the one having 1 to 10 carbon atoms is preferable, and the one having 1 to 3 carbon atoms is more preferable. Examples of such a perfluoroalkyl group include those represented by —$C_nF_{2n-1}$ (where n is an integer of 1 to 10), for example, —$CF_3$, —$CF_2CF_3$, —$C_3F_7$, and —$C_4F_9$. Among these perfluoroalkyl groups, —$CF_3$, and —$CF_2CF_3$ are particularly preferable. In a compound represented by Formula (F-3), m, n, and p each denote an integer; n is preferably an integer of 1 to 4; m is preferably an integer of 6 to 25; and p is preferably an integer of 1 to 4.

As Rf in a compound represented by Formula (F-4), a similar perfluoroalkyl group to that described in Formula (F-3) is preferably used. For example, —$CF_3$, —$CF_2CF_3$, —$C_3F_7$, —$C_4F_9$ and the like are preferably used. In a compound represented by Formula (F-4), X denotes a cation group. Examples thereof include a quaternary ammonium group; alkali metals such as sodium, and potassium; triethylamine, and triethanolamine. Among these, quaternary ammonium group is particularly preferable. In the compound represented by Formula (F-4), Y denotes an anion group. Examples thereof include —$COO^-$, —$SO_3^-$, —$SO_4^-$, and —$PO_4^-$.

In Formula (F-4), q denotes an integer, and is preferably an integer of 1 to 6.

As the at least one fluorine-based surfactant selected from the compounds represented by one of Formulae (F-3) and (F-4), a compound selected from compounds represented by one of Formulae (F-3-1) and (F-4-1) is preferable from the standpoint of safety.

Formula (F-3-1)

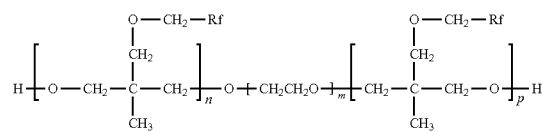

in Formula (F-3-1), Rf denotes —$CF_3$, or —$CF_2CF_3$; n denotes an integer of 1 to 4; m denotes an integer of 6 to 25; and p denotes an integer of 1 to 4.

Formula (F-4-1)

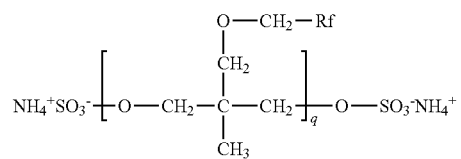

in Formula (F-4-1), Rf denotes —$CF_3$, or —$CF_2CF_3$; and q denotes an integer of 1 to 6.

The amount of the fluorine-based surfactant contained in the liquid composition of the present embodiment is preferably 0.01% by mass to 10% by mass, and more preferably 0.03% by mass to 5% by mass. When the amount of the fluorine-based surfactant is less than 0.01% by mass, an visually observable effect of improvement in color saturation may not be obtained, and an effect of causing a vehicle in the ink quickly penetrate into a recording medium to improve the fixability may not be obtained. When the amount of the fluorine-based surfactant is more than 10% by mass, the effect may not change even when the addition amount thereof is increased, and the fluorine-based surfactant may not be dissolved into a pretreatment liquid, and thus the physical properties of the resulting liquid may be unstable.

In the liquid composition of the present embodiment, the fluorine-based surfactants selected from Formulae (F-1) to (F-4) may be used alone or in combination. Further, the fluorine-based surfactant may be used in combination with another fluorine-based surfactant, a nonionic surfactant, an anionic surfactant, an amphoteric surfactant, an acetylene glycol-based surfactant, or the like.

<<Penetrant>>

The liquid composition of the present embodiment preferably contains as the penetrant at least one of non-wettable polyol compounds having 8 to 11 carbon atoms, and glycol ether compounds. Among these, preferred are those having solubility from 0.2% by mass to 5.0% by mass in water of 25° C., with 2-ethyl-1,3-hexanediol (solubility: 4.2% (25° C.)), and 2,2,4-trimethyl-1,3-pentanediol (solubility: 2.0% (25° C.)) being particularly preferable.

Examples of the non-wettable polyol compound include fatty acid diols such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, and 5-hexene-1,2-diol.

Other penetrants usable in combination are not particularly limited, as long as it can be dissolved into the liquid composition to thereby adjust physical properties of the liquid composition to desired physical properties, and may be suitably selected in accordance with the intended use. Examples thereof include alkyl ethers and aryl ethers of polyhydric alcohols such as diethylene glycol monophenyl ether, ethylene glycol monophenyl ether, ethylene glycol monoallyl ether, diethylene glycol monophenyl ether, diethylene glycol monobutyl ether, propylene glycol monobutyl ether, tetraethylene glycol chlorophenyl ether; and lower alcohols such as ethanol.

The amount of the penetrant contained in the liquid composition is preferably 0.1% by mass to 5.0% by mass. When the amount of the penetrant is less than 0.1% by mass, the effect of causing the liquid composition to penetrate into a recording medium may wear off. When the amount is more than 5.0% by mass, the penetrant segregates from the solvent due to the low solubility of the penetrant thereto, and thus the effect of improving the permeability of the liquid composition may be saturated.

<<Anti-Foaming Agent>>

The liquid composition of the present embodiment may contain an anti-foaming agent for the purpose of suppressing foaming (which means that a liquid is formed into a thin film to enfold air). Generally, a liquid having high surface tension, like water, hardly foams because a force of reducing the surface area thereof as much as possible works. Whereas a liquid having low surface tension and high viscosity easily foams, foams generated are retained and hardly removed. When the liquid composition of the present embodiment contains the above-mentioned water-soluble cationic polymer, water-soluble organic solvent, surfactant and the like, the surface tension thereof decreases and the viscosity thereof increases. For this reason, the liquid composition easily foams. To prevent this, an anti-foaming agent is preferably used therein.

In the present embodiment, when the liquid composition contains the fluorine-based surfactant, the surface tension of the liquid composition is significantly reduced. In this case, usually an anti-foaming agent, which is a component insoluble in liquid, is used to intersperse this component in the surface of foams, to thereby suppress foaming. However, such a component insoluble in liquid degrades discharge stability and storage stability. In the present embodiment, to prevent this problem, when the liquid composition contains a fluorine-based surfactant, an anti-foaming agent represented by Formula (6) is favorably used. The anti-foaming agent represented by Formula (6) has high compatibility with fluorine-based surfactants, and the anti-foaming agent is efficiently incorporated into a foamed film. It can be considered that for this reason, the surface of the foamed film is locally in an imbalance condition due to a difference in surface tension between the fluorine-based surfactant and the anti-foaming agent, and foams are broken.

$$HOR_1R_3C-[CH_2]_n-CR_2R_4OH \quad \text{Formula (6)}$$

in Formula (6), $R_1$ and $R_2$ each independently denote an alkyl group having 3 to 6 carbon atoms; $R_3$ and $R_4$ each independently denote an alkyl group having 1 to 2 carbon atoms; and n denotes an integer of 1 to 6.

The anti-foaming agent represented by Formula (6) is not particularly limited and may be suitably selected in accordance with the intended use. However, 2,4,7,9-tetramethyl-decane-4,7-diol, and 2,5,8,11-tetramethyldodecane-5,8-diol are preferable, and from the viewpoints of anti-foaming effect and high solubility in the liquid composition, 2,5,8,11-tetramethyldodecane-5,8-diol is particularly preferable.

The amount of the anti-foaming agent contained in the liquid composition is preferably 0.01% by mass to 10% by mass, and more preferably 0.02% by mass to 5% by mass. When the amount of the anti-foaming agent is less than 0.01% by mass, the anti-foaming effect may not be sufficiently obtained. When it is more than 10% by mass, the anti-foaming effect may not change even when the addition amount thereof is increased, and the anti-foaming agent may not be dissolved into the liquid composition.

The liquid composition of the present embodiment may contain a known antiseptic agent, and a known anti-corrosive agent, etc. used in a typical ink.

(Ink)

Next, a recording method of the present embodiment will be described. The ink for use in the recording method of the present embodiment contains negatively charged and colorant-containing particles, and water. With this, the particles are dispersed in the water and the like by electrostatic repulsion. The color of the ink is not particularly limited and may be suitably selected in accordance with the intended use. Examples thereof include yellow, magenta, cyan, and black. When recording is performed using an ink set in which two or more of these color inks, a color image can be recorded. When recording is performed using an ink set which uses at least three color inks in combination, a full color image can be recorded.

The ink is suitably used in an inkjet recording method using a recording apparatus such as a so-called piezo-type recording apparatus (see Japanese Patent Application Laid-Open (JP-A) No. 02-51734), a so-called thermal type recording apparatus (see Japanese Patent Application Laid-Open (JP-A) No. 61-59911), and a so-called electrostatic type recording apparatus (see Japanese Patent Application Laid-Open (JP-A) No. 06-71882). Also, the ink is suitably used in a recording apparatus which heats a recording medium and ink upon recording or before or after recording to accelerate fixing of a recorded matter. Further, the ink is also used in a recording apparatus which heats a recording medium and ink upon recording or before or after recording to, for example, from 50° C. to 200° C. to accelerate fixing of a recorded matter.

Physical properties of the ink of the present embodiment are not particularly limited and may be suitably selected in accordance with the intended use. For example, the viscosity, and the surface tension of the ink are each preferably within the following ranges.

First, the viscosity of the ink at 25° C. is preferably 5 mPa·s to 20 mPa·s. By adjusting the viscosity of the ink to 5 mPa·s or higher, the density and quality of an image to be recorded can be improved. Meanwhile, by adjusting the viscosity of the ink to 20 mPa·s or lower, excellent discharge stability can be obtained. Here, the viscosity can be measured at 25° C. using a viscometer (e.g., RE-550L, manufactured by TOKI SANGYO Co., Ltd.).

The surface tension of the ink at 25° C. is preferably 20 mN/m to 35 mN/m, and more preferably 20 mN/m to 30 mN/m. When the surface tension of the ink is from 20 mN/m to 35 mN/m, the permeability of the ink is enhanced, and even when the ink is recorded on plain paper, the drying properties are excellent, to thereby suppress color bleeding. Further, the ink is easily wet in a liquid composition-attached portion of a recording medium i.e., a portion of a recording medium onto which the liquid composition has been attached, the color saturation of a resulting recorded matter is increased, and the resistance to white-out is also improved. When the surface tension is higher than 35 mN/m, the leveling of the ink (which means that an ink is uniformly spread on a surface of a recording medium while wetting the surface thereof) easily occurs on a recording medium, which may lead to lengthening of duration for drying the ink.

Next, individual components contained in the ink will be described.

<Colorant>

In the ink, as a water-dispersible colorant, a pigment is mainly used from the standpoint of weatherability, however, to control the color tone, a dye may be used in combination within a range not degrading the weatherability. The pigment is not particularly limited and may be suitably selected in accordance with the intended use. For example, an inorganic pigment or organic pigment for black color ink or an inorganic pigment or organic pigment for color ink is used. These pigments may be used alone or in combination. The amount of the colorant contained in the ink is preferably, in terms of solid content, 2% by mass to 15% by mass, and more preferably 3% by mass to 12% by mass. When the amount of the colorant is less than 2% by mass, the color saturation and image density of a resulting recorded matter may decrease. When the amount of the pigment is more than 15% by mass, it is unfavorable because the discharge stability may degrade due to the increased viscosity of the ink.

Here, the solid content of the ink is measured, for example, by a method of isolating only the water-dispersible colorant and the water-dispersible resin fraction from the ink. In addition, when a pigment is used as the water-dispersible colorant, a ratio between the colorant and the water-dispersible resin is measured by determining a mass reduction rate through thermal mass spectrometry. When the molecular structure of the colorant is clearly known, the solid content of a pigment or dye can be determined using a specific wavelength of a spectrophotometer. As for an inorganic pigment containing a heavy metal atom in a molecular skeleton, a gold-containing organic pigment, and a gold-containing dye, the solid content of the colorant can be determined through X-ray fluorescence analysis.

As the inorganic pigment, there may be used an titanium oxide, iron oxide, calcium carbonate, barium sulfate, aluminum hydroxide, barium yellow, cadmium red and chrome yellow; and carbon black produced by a conventionally known method such as a contact method, a furnace method, a thermal method or the like.

As the organic pigment, there may be used azo pigments (including azo lake, insoluble azo pigment, condensed azo pigment, chelate azo pigment, etc.), polycyclic pigments (e.g., phthalocyanine pigment, perylene pigment, perynone pigment, anthraquinone pigment, quinacridone pigment, dioxazine pigment, indigo pigment, thioindigo pigment, isoindolinone pigment, and quinophthalone pigment), dye chelates (e.g., basic dye-type chelate, and acid dye-type chelate), nitro pigments, nitroso pigments, and aniline black. Among these pigments, those having excellent affinity with water are particularly preferably used.

Specific examples of preferably usable black color pigments include carbon black (C.I. Pigment Black 7), such as furnace black, lamp black, acetylene black, and channel black, or metals such as copper, iron (C.I. Pigment Black 11), and titanium oxide, and organic pigments such as aniline black (C.I. Pigment Black 1). Specific examples of preferably usable color pigments include C.I. Pigment Yellow 1, 3, 12, 13, 14, 17, 24, 34, 35, 37, and 42 (yellow iron oxide), 53, 55, 74, 81, 83, 95, 97, 98, 100, 101, 104, 408, 109, 110, 117, 120, 128, 138, 150, 151, 153, 183, C.I. Pigment Orange 5, 13, 16, 17, 36, 43, and 51, C.I. Pigment Red 1, 2, 3, 5, 17, 22, 23, 31, 38, 48:2, and 48:2 (Permanent Red 2B(Ca)), 48:3, 48:4, 49:1, 52:2, 53:1, and 57:1 (Brilliant Carmine 6B), 60:1, 63:1, 63:2, 64:1, 81, 83, 88, and 101 (colcothar), 104, 105, 106, 108 (Cadmium Red), 112, 114, 122 (quinacridone magenta), 123, 146, 149, 166, 168, 170, 172, 177, 178, 179, 185, 190, 193, 209, and 219, C.I. Pigment Violet 1 (Rhodamine Lake), 3, 5:1, 16, 19, 23, and 38, C.I. Pigment Blue 1, 2, 15, 15:1, 15:2, 15:3 (phthalocyanine blue), 16, 17:1, 56, 60, 63, and C.I. Pigment Green 1, 4, 7, 8, 10, 17, 18, and 36.

In the present embodiment, the colorant is dispersed as negatively charged particles in water. In this case, as a sub-embodiment of dispersing the pigment in water, the following first to third sub-embodiments described below are preferable.

In the first sub-embodiment, a dispersoid obtained by incorporating a water-insoluble or sparingly water-soluble coloring material into polymer fine particles (which may be referred to as "a pigment coated with a resin") is dispersed in water serving as a dispersion medium to produce a polymer emulsion (a water dispersion of polymer fine particles containing a coloring material). Note that in this case, the dispersoid contains solid fractions, and in the present embodiment, this is referred to as "an emulsion".

In the second sub-embodiment, a pigment having at least one hydrophilic group on its surface and showing water-dispersibility in the absence of dispersants (the pigment is, otherwise, referred to as "a self-dispersible pigment") is dispersed in water.

In the third sub-embodiment, a pigment is dispersed in water using an anionic dispersant or a nonionic dispersant.

Examples of the polymer emulsion for use in the first sub-embodiment include a polymer emulsion obtained by dispersing in a dispersion medium a dispersoid in which a pigment is encapsulated in polymer fine particles or a dispersoid in which a pigment is adsorbed on surfaces of polymer fine particles. In this case, the entire pigment is not necessarily encapsulated in or adsorbed onto polymer fine particles, and it is allowable that the pigment is dispersed in the emulsion within a range not impairing the effects of the present embodiment. Examples of a polymer (polymer in polymer fine particles) forming the polymer emulsion include anionic vinyl polymers, polyester-based polymers, and polyurethane-based polymers. Particularly preferably usable polymers are vinyl-based polymers and polyester-based polymers. Polymers disclosed in Japanese Patent Application Laid-Open (JP-A) Nos. 2000-53897, 2001-139849 and the like can be used.

The self-dispersible pigment according to the second sub-embodiment is a pigment in which at least one hydrophilic group is bonded, directly or via another atomic group, to a surface of a pigment to modify the surface of the pigment. To modify the surface of the pigment, there may be used a method in which a predetermined anionic functional group (a functional group such as a sulfone group and a carboxyl group) is chemically bonded to a surface of a pigment, or a method in which a pigment is subjected to a wet-process oxidation treatment using at least one of a hypohalous acid, such as hypochlorous acid or a salt thereof. Among these methods, particularly preferred is a sub-embodiment in which a carboxyl group is bonded to a surface of a pigment and the pigment is dispersed in water. When a carboxyl group is bonded to a surface of a pigment, not only the dispersion stability of the pigment is improved, but also a high quality image can be obtained, and the water resistance of a resulting recorded recording medium is more improved. Further, an ink containing the self-dispersible pigment according to the second sub-embodiment is excellent in re-dispersibility after drying, and even when recording is stopped for a long period of time and the water content of the ink filled in a nozzle in a recording apparatus is evaporated, excellent recording can be easily performed with a simple cleaning operation, without causing nozzle clogging. To obtain such properties, the volume average particle diameter ($D_{50}$) of the self-dispersible pigment in the ink is preferably 0.01 μm to 0.16 μm. Here, "$D_{50}$" is also called a median diameter, and means a diameter of particles by which the particles are divided into two groups, and an amount of the large group and an amount of the small group are equal (for example, such as volume average particle diameter). Note that, in the present embodiment, when a self-dispersible pigment according to the second sub-embodiment is used, the ink preferably contains a water-dispersed resin, which will be described below, for improving the fixability (abrasion resistance) of the coloring material on a recording medium and improving the color-developing ability.

When the self-dispersible pigment is a self-dispersible carbon black, as an anionic functional group to be bonded to the carbon black, —COOM, —$SO_3M$, —$PO_3HM$, —$PO_3M_2$, —$SO_2NH_2$, and —$SO_2NHCOR$ (where M denotes an alkali metal, ammonium or organic ammonium; and R denotes an alkyl group having 1 to 12 carbon atoms, a phenyl group that may have a substituent or a naphthyl group that may have a substituent.) may be used. Among these, —COOM, and —$SO_3M$ are preferable.

When "M" in the above-mentioned anionic functional group is an alkali metal, for example, lithium, sodium, or potassium is used as the alkali metal. When "M" is organic ammonium, for example, mono-, dim-, and tri-methyl ammonium, mono-, di-, and tri-ethyl ammonium, or mon-, dim-, and tri-methanol ammonium may be used as the organic ammonium. The anionic functional group may be bonded to a surface of carbon black via other atomic groups. Examples of the other atomic groups include an alkyl group having 1 to 12 carbon atoms, a phenyl group that may have a substituent or a naphthyl group that may have a substituent. Specific examples of the functional group to be bonded on a surface of carbon black via other atomic groups include —$C_2H_4COOM$ (where M denotes an alkali metal or quaternary ammonium.), and -$PhSO_3M$ (where Ph denotes a phenyl group; and M denotes an alkali metal or quaternary ammonium.).

When the self-dispersible pigment is a color pigment, in order to obtain a color pigment having the above-mentioned anionic functional group, the above-mentioned anionic functional group (e.g., —COONa) can be introduced into the color pigment by a method in which the color pigment is subjected to an oxidation treatment using hypochlorous acid soda, a method of sulfonating the color pigment, a method of reacting a diazonium salt with the color pigment or the like.

In the third sub-embodiment, the above-mentioned pigment is dispersed in water by an anionic dispersant or a nonionic dispersant.

Examples of the anionic dispersant include polyoxyethylene alkylether acetate, an alkylbenzene sulfonic acid salt ($NH_4$, Na, Ca), an alkyldiphenylether disulfonic acid salt ($NH_4$, Na, Ca), a sodium salt of dialkylsuccinate sulfonate, a sodium salt of a naphthalene sulfonate-formalin condensate, an ester salt of a polyoxyethylene polycyclic phenylether sulfate ($NH_4$, Na), a lauric acid salt, a sulfate salt of polyoxyethylene alkylether, and an oleic acid salt. Among these, a sodium salt of dioctyl sulfosuccinate, and an ammonium salt of polyoxyethylene styrene phenylether sulfonate are particularly preferable.

As the nonionic surfactant, a nonionic surfactant having an HLB value of 10 to 20 is preferable. Examples thereof include polyoxyethylene alkylether, polyoxyalkylene alkyl ether, polyoxyethylene polycyclic phenyl ether, sorbitan fatty acid ester, polyoxyethylene sorbitan fatty acid ester, polyoxyethylene alkyl phenyl ether, polyoxyethylene alkyl amine, polyoxyethylene alkyl amide, and acetylene glycol. Among these, polyoxyethylene lauryl ether, polyoxyethylene-β-naphthylether, polyoxyethylene sorbitan monooleate, and polyoxyethylene styrene phenyl ether are particularly preferable. Note that, when a nonionic dispersant is used, the entire system of the ink can also be negatively charged by using a negatively charged resin emulsion in combination with the nonionic dispersant.

In the third sub-embodiment, the pigment dispersion is produced in the following method. First, the above-mentioned pigment dispersant is dissolved in an aqueous medium. Next, the organic pigment or the inorganic pigment is added thereto, and the system is sufficiently wetted, followed by high-speed stirring through use of a homogenizer, or stirring and dispersing through use of a dispersing machine using a ball such as a bead mill and a ball mill, a dispersion kneader using a shearing force such as a roll mill, a ultrasonic wave dispersing machine, or the like. In most cases, coarse particles are contained in the resulting pigment dispersion after such a kneading/dispersing step. This causes nozzle clogging and/or clogging of an ink-supply channel in a recording apparatus, and thus there is a need to remove particles each having a particle diameter of 1 μm or greater using a filter or a centrifugal separator.

In the present embodiment, it is preferable that the dispersant be used in an amount of 1 part by mass to 100 parts by mass, and more preferably in an amount of 10 parts by mass to 50 parts by mass, relative to 100 parts by mass of the pigment. When the amount of the dispersant is small, it is impossible to form the pigment into sufficiently fine particles. When the amount of the dispersant is excessively large, excess components of the dispersant not adsorbed on the pigment adversely affect physical properties of the resulting ink, which may cause ink bleeding, and degradation of water resistance and abrasion resistance of an image to be recorded. Note that in the present embodiment, when the self-dispersible pigment according to the third sub-embodiment is used, the ink preferably contains a water-dispersed resin, which will be described below, for improving the fixability (abrasion resistance) of the coloring material on a recording medium and improving the color-developing ability.

Further, to stabilize the pigment dispersion, a water-soluble polymer compound having a weight average molecular weight of 30,000 or lower may be used in combination. As the water-soluble polymer compound, generally, a water-soluble styrene-acrylic resin, a water-soluble acrylic resin, water-soluble polyurethane, water-soluble polyester, water-soluble styrene-maleic acid copolymer, and water-soluble α-olefin-maleic acid copolymer each having a weight average molecular weight of 30,000 or lower are preferable. Among these, water-soluble polyurethane and water-soluble polyester each having a weight average molecular weight of 30,000 or lower, and a water-soluble α-olefin-maleic acid copolymer represented by Formula (7) are particularly preferable.

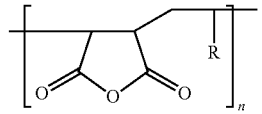

Formula (7)

in Formula (7), R denotes an alkyl group having 6 to 22 carbon atoms, and n denotes an integer of about 30 to about 100.

The acid value of the water-soluble α-olefin-maleic acid copolymer represented by Formula (7) is preferably 100 mgKOH/g to 400 mgKOH/g. When the acid value is lower than 100 mgKOH/g, the solubility of the pigment dispersion may degrade. On the other hand, when the acid value is higher than 400 mgKOH/g, the viscosity of the pigment dispersion increases, and there is a possibility that the ink-discharge properties easily degrade and the dispersion stability of the pigment dispersion easily degrades. The weight average molecular weight of the water-soluble α-olefin-maleic acid copolymer represented by Formula (7) is preferably 5,000 to 20,000. When the weight average molecular weight is lower than 5,000, the dispersion stability of the pigment dispersion may degrade. On the other hand, when the weight average molecular weight is higher than 20,000, the solubility of the pigment dispersion may degrade, and the viscosity thereof may increase.

The amount of the water-soluble polymer compound contained in the pigment dispersion (in terms of solid content) is preferably 1 part by mass to 100 parts by mass, and more preferably 5 parts by mass to 50 parts by mass, relative to 100 parts by mass of the pigment. When the amount of the water-soluble polymer compound is less than 1 part by mass, the effect of improving the dispersion stability may be insufficient. On the other hand, when the amount of the water-soluble polymer compound is higher than 100 parts by mass, the viscosity of the ink increases, the discharge stability thereof may degrade, and it may make no difference in the effect of improving the dispersion stability even when the amount thereof is increased.

The volume average particle diameter ($D_{50}$) of the pigment of the present embodiment is preferably 150 nm or smaller in an ink, and more preferably 100 nm or smaller. When the volume average particle diameter ($D_{50}$) of the pigment is greater than 150 nm, the discharge stability of the resulting ink rapidly degrades, and nozzle clogging and ink ejection deviation easily occur. On the other hand, when the volume average particle diameter ($D_{50}$) is 100 nm or smaller, the discharge stability is improved, and the color saturation of an image is also improved. The amount of the pigment in the ink is preferably 1% by mass to 15% by mass, and more preferably 2% by mass to 12% by mass. Moreover, the polymer emulsion according to the first sub-embodiment in which a pigment is coated with anionic polymer fine particles, and the self-dispersible pigment according to the second sub-embodiment, and the water-dispersible colorant according to the third sub-embodiment may be used in combination in the form of a mixture.

<Water-Soluble Organic Solvent>

A water-soluble organic solvent for use in the ink is not particularly limited, however, a similar water-soluble organic solvent to that used in the above-described liquid composition is preferably used. The mass ratio of the water-dispersible colorant to the water-soluble organic solvent in the ink influences the discharge stability of the ink discharged from an inkjet head. For example, when the amount of the water-soluble organic solvent is small although the solid content of the water-dispersible colorant is high, evaporation of water present in the vicinity of an ink meniscus of a nozzle may proceed to cause a discharge defect. The amount of the water-soluble organic solvent contained in the ink is preferably 20% by mass to 50% by mass, and more preferably 20% by mass to 45% by mass. When the amount of the water-soluble organic solvent is less than 20% by mass, there is a possibility that the discharge stability degrades and a waste ink adheres to a maintenance device in a recording apparatus. When the amount of the water-soluble organic solvent is more than 50% by mass, the drying properties thereof may degrade on a paper surface, and the quality of a recorded matter may further degrade.

<Surfactant>

As a surfactant for use in the ink, a similar surfactant to that used in the liquid composition of the present embodiment is preferably used. Among these preferably usable surfactants, it is preferable to select a surfactant having low surface tension and high permeability and high leveling properties, without impairing the dispersion stability of the pigment dispersion depending on the type of the water-dispersible colorant and combination of the water-soluble organic solvent with the surfactant. Specifically, at least one selected from an anionic surfactant, a nonionic surfactant, a silicone-based surfactant and a fluorine-based surfactant is preferably used. Among these, a silicone-based surfactant and a fluorine-based surfactant are particularly preferably used. These surfactants may be used alone or in combination. The amount of the surfactant contained in the ink is preferably 0.01% by mass to 3.0% by mass, and more preferably 0.5% by mass to 2% by mass. When the amount of the surfactant is less than 0.01% by mass, the effect obtained when adding the surfactant may be insufficient, and whereas, when it is more than 3.0% by mass, the permeability of the ink to a recording medium is increased more than necessary, the image density of a recorded image may degrade, and strikethrough (this means that the ink attached to a recording medium penetrates through the recording medium and an recorded image is distinguished from the rear surface of the recorded image) may occur.

<Penetrant>

A penetrant for use in the ink, a similar penetrant to that used in the liquid composition of the present embodiment is preferably used. The amount of the penetrant contained in the ink is preferably 0.1% by mass to 4.0% by mass. When the amount of the penetrant is less than 0.1% by mass, the drying properties of the ink degrades, and bleeding may occur in a recorded image. When the amount of the penetrant is more than 4.0% by mass, the dispersion stability of the colorant is impaired, nozzle clogging may easily occur in a recording apparatus, and the permeability of the ink to a recording medium is increased more than necessary, which may cause a decrease in image density of a recorded matter and strikethrough.

<Water-Dispersible Resin>

The above-mentioned water-dispersible resin is formed into a film on a recorded matter onto which the ink has been made to adhere, and is used for improving the water repellency, water resistance and weatherability of a recorded image and improving the image density and color saturation thereof. Examples of this water-dispersible resin include condensed type synthetic resins, addition type synthetic resins, and natural polymer compounds.

Examples of the condensed type synthetic resins include polyester resins, polyurethane resins, polyepoxy resins, polyamide resins, polyether resins, poly(meth)acrylic resins, acryl-silicone resins, and fluorine-based resins.

Examples of the addition type synthetic resins include polyolefin resins, polystyrene-based resins, polyvinyl alcohol-based resins, polyvinyl ester-based resins, polyacrylic acid-based resins, and unsaturated carboxylic acid-based resins.

Examples of the natural polymer compounds include celluloses, rosins, and natural rubbers.

Among these, polyurethane resin fine particles, acryl-silicone resin fine particles, and fluorine-based resin fine particles are particularly preferable. These water-dispersible resins may be used in combination.

Here, as for the fluorine-based resin fine particles, fluorine-based resin fine particles having a fluoroolefin unit are preferable. Among these, fluorine-containing vinylether-based resin fine particles composed of a fluoroolefin unit and a vinylether unit are particularly preferable. The fluoroolefin unit is not particularly limited and may be suitably selected in accordance with the intended use. Examples thereof include divalent fluoroolefin groups, such as —$CF_2CF_2$—, —$CF_2CF$($CF_3$)—, and —$CF_2CFCl$—. The vinylether unit is not particularly limited and may be suitably selected in accordance with the intended use. Examples thereof include compounds represented by each of the following structural formula.

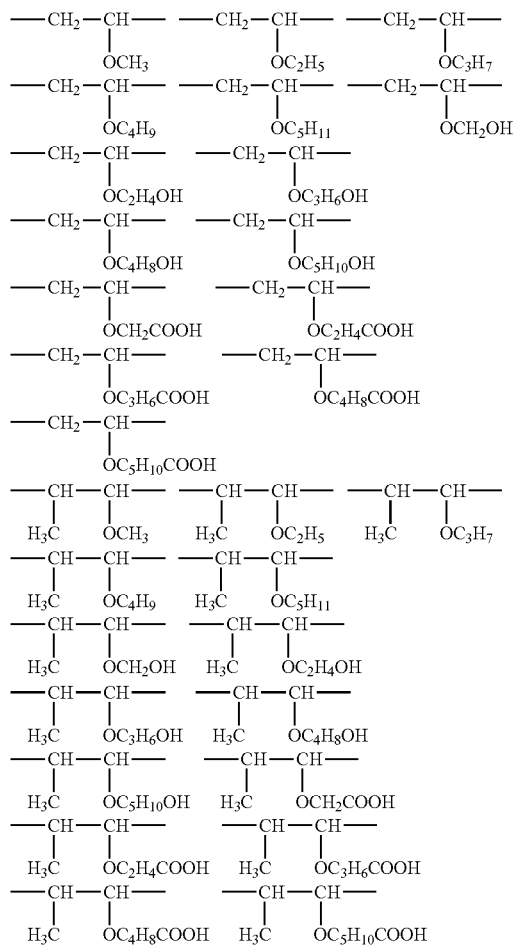

As for the fluorine-containing vinylether-based resin fine particles composed of a fluoroolefin unit and a vinylether unit, an alternate copolymer in which a fluoroolefin unit and a vinylether unit are alternately copolymerized is preferable. As such fluorine-based resin fine particles, suitably synthesized one and a commercially available product may be used. Examples of the commercially available products include FLUONATE FEM-500 and FEM-600, DICGUARD F-52S, F-90, F-90M, F-90N and AQUAFURAN TE-5A manufactured by DIC Corporation; LUMIFLON FE4300, FE4500, FE4400, ASAHI GUARD AG-7105, AG-950, AG-7600, AG-7000, and AG-1100 manufactured by Asahi Glass Co., Ltd.

As for the water-dispersible resin, both a homopolymer and a composite resin made of a copolymer may be used, and any of a single-phase structured type emulsion, a core-shell type emulsion and a power-feed type emulsion may be used.

As the water-dispersible resin, a water-dispersible resin in which a resin itself has a hydrophilic group and self-dispersibility and a water-dispersible resin in which a resin itself does not have dispersibility and to which the dispersibility is imparted by a surfactant and a resin having a hydrophilic group are used. Among these, an emulsion of resin particles obtained by emulsification or suspension polymerization of an ionomer of a polyester resin, a polyurethane resin or an unsaturated monomer is preferably used. Here, when an unsaturated monomer is emulsion polymerized, a water-dispersible resin is easily produced because a resin emulsion is obtained by reacting water into which the unsaturated monomer, a polymerization initiator, a surfactant, a chain transfer agent, a chelating agent, a pH adjustor etc. have been added. In this case, a water-dispersible resin having intended physical properties can be easily produced because components constituting the resin are easily changed.

As for the unsaturated monomer, unsaturated carboxylic acids, monofunctional or polyfunctional (meth)acrylic acid ester monomers, (meth)acrylic acid amide monomers, aromatic vinyl monomers, vinyl cyano compound monomers, vinyl monomers, allyl compound monomers, olefin monomers, diene monomers, oligomers having an unsaturated carbon etc. can be used alone or in combination. The physical properties of a water-dispersible resin produced can be easily changed by using these monomers in combination. Further, the physical properties of the resin can also be modified by subjecting the components to a polymerization reaction or graft reaction using an oligomer type polymerization initiator as a polymerization initiator.

Examples of the unsaturated carboxylic acids serving as the unsaturated monomer include an acrylic acid, methacrylic acid, itaconic acid, fumaric acid, and maleic acid.

Examples of the monofunctional (meth)acrylic acid ester monomers include methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, 2-hydroxyethyl methacrylate, 2-hydroxypropyl methacrylate, dimethyl aminoethyl methacrylate, methacryloxy ethyl trimethyl ammonium salts, 3-methacryloxypropyl trimethoxysilane, methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, 2-hydroxyethyl acrylate, 2-hydroxypropyl acrylate, dimethyl aminoethyl acrylate, and acryloxy ethyl trimethyl ammonium salts.

Examples of the polyfunctional (meth)acrylic acid ester monomers include ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, 2,2'-bis (4-methacryloxydiethoxyphenyl)propane, trimethylol propane trimethacrylate, trimethylol ethane trimethacrylate, polyethylene glycol diacrylate, triethylene glycol diacrylate, 1,3-butylene glycol diacrylate, 1,4-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxyphenyl)propane, 2,2'-bis(4-acryloxydiethoxyphenyl)propane trimethylol propane triacrylate, trimethylolethane triacrylate, tetramethylolmethane triacrylate, ditrimethylol tetraacrylate, tetramethylol methane tetraacrylate, pentaerythritol tetraacrylate, and dipentaerythritol hexaacrylate.

Examples of the (meth)acrylic acid amide monomers include acrylamide, methacrylamide, N,N-dimethyl acrylamide, methylene bis-acrylamide, and 2-acrylamide-2-methylpropane sulfonic acid. Examples of the aromatic vinyl monomers include styrene, α-methylstyrene, vinyl toluene, 4-t-butylstyrene, chlorostyrene, vinyl anisole, vinyl naphthalene, and divinyl benzene.

Examples of the vinyl cyano compound monomers include acrylonitrile, and methacrylonitrile.

Examples of the vinyl monomers include vinyl acetate, vinylidene chloride, vinyl chloride, vinyl ether, vinyl ketone, vinyl pyrrolidone, vinyl sulfonic acid or salts thereof, vinyl trimethoxysilane, and vinyl triethoxysilane.

Examples of the allyl compound monomers include allylsulfonic acid or salts thereof, allylamine, allyl chloride, diallylamine, and diallyldimethyl ammonium salts.

Examples of the olefin monomers include ethylene, and propylene.

Examples of the diene monomers include butadiene, and chloroprene.

Examples of the oligomers having an unsaturated carbon include styrene oligomers each having a methacryloyl group, styrene-acrylonitrile oligomers each having a methacryloyl group, methyl methacrylate oligomers each having a methacryloyl group, dimethyl siloxane oligomers each having a methacryloyl group, and polyester oligomers each having an acryloyl group.

Since a water-dispersible resin undergoes dispersion breaking and breaking of molecular chains due to hydrolysis, under a strong alkaline or strong acidic condition, the pH of the water-dispersible resin before being added into an ink is preferably 4 to 12. Particularly, from the standpoint of miscibility with a water-dispersible colorant, the pH is more preferably 6 to 11, and still more preferably 7 to 9. The average particle diameter ($D_{50}$) of the water-dispersible resin relates to the viscosity of the dispersion liquid. When water-dispersible resins having the same composition and the same concentration of solid content, the smaller the particle diameter, the higher the viscosity is. Therefore, the average particle diameter ($D_{50}$) of the water-dispersible resin is preferably 50 nm or greater so that the viscosity of the resulting ink is not excessively high. When the particle diameter of the water-dispersible resin is several ten micrometers, it is greater than the diameter of a nozzle of an inkjet head in a recording apparatus. When such particles having large particle diameters are present in the resulting ink, the discharge stability of the ink degrades. Then, to secure the discharge stability of the ink, the average particle diameter ($D_{50}$) of the water-dispersible resin is preferably 200 nm or smaller, and more preferably 150 nm or smaller.

Further, since the water-dispersible resin has a function to fix a water-dispersible colorant on a recording medium, it is preferable to form it into a film at normal temperature. For this reason, the minimum film-forming temperature (MFT) of the water-dispersible resin is preferably 30° C. or lower. In addition, when the glass transition temperature of the water-dispersible resin is lower than −40° C., the consistency of the resin film is higher, and tacking (which means stickiness, and viscosity) may occur on a recorded matter. For this reason, the glass transition temperature of the water-dispersible resin is preferably −40° C. or higher, and more preferably −30° C. or higher. The amount of the water-dispersible resin contained in the ink is preferably 1% by mass to 15% by mass, and more preferably 2% by mass to 7% by mass, in terms of solid content.

<Other Components>

Next, other components that can be added to an ink used in the recording method of the present embodiment will be described. Such other components are not particularly limited and may be suitably selected as required. Examples thereof include a pH adjustor, an antiseptic-antifungal agent, a chelating reagent, an anti-corrosive agent, an antioxidant, a ultraviolet absorber, an oxygen absorbent, and a light stabilizer.

<<pH Adjustor>>

The pH adjustor is not particularly limited, as long as it can adjust the pH of an ink formulated to 7 to 11 without adversely affecting the ink, and may be suitably selected in accordance with the intended use. When the pH of the ink is lower than 7 or higher than 11, the ink may dissolve a head or ink-supplying unit of a recording device to thereby change the properties of the ink or to cause leakages of the ink, which may cause problems such as discharge defect. Examples of the pH adjustor preferably used in the present embodiment include alcohol amines, hydroxides of alkali metal elements, ammonium hydroxides, phosphonium hydroxides, and carbonates of alkali metals.

Examples of the alcohol amines include diethanolamine, triethanolamine, and 2-amino-2-ethyl-1,3-propane diol. Examples of the hydroxide of alkali metal element include lithium hydroxides, sodium hydroxides, and potassium hydroxides. Examples of the hydroxide of ammonium include ammonium hydroxides, quaternary ammonium hydroxides, and quaternary phosphonium hydroxides. Examples of the carbonate of alkali metal include lithium carbonates, sodium carbonates, and potassium carbonates.

<<Antiseptic-Antifungal Agent>>

As the antiseptic-antifungal agent, sodium dehydroacetate, sodium sorbate, sodium 2-pyridinethiol-1-oxide, sodium benzoate, sodium pentachlorophenol, a 1,2-benzoisothiazoline-3-on sodium compound, and the like are suitably used.

<<Chelating Reagent>>

As the chelating reagent, sodium ethylenediamine tetraacetate, sodium nitrilo triacetate, sodium hydroxyethyl ethylenediamine triacetate, sodium diethylene triamine pentaacetate, sodium uramil diacetate, and the like are suitably used.

<<Anti-Corrosive Agent>>

As the anti-corrosive agent, acid sulfite, sodium thiosulfate, ammonium thiodiglycolate, diisopropyl ammonium nitrite, pentaerythritol tetranitrate, dicyclohexyl ammonium nitrite, 1,2,3-benzotriazole, and the like are suitably used.

<<Anti-Oxidant>>

As the anti-oxidant, phenol-based anti-oxidants (including hindered phenol-based anti-oxidants), amine-based anti-oxidants, sulfur-based anti-oxidants, phosphorous-based anti-oxidants, and the like are suitably used.

<<Ultraviolet Absorbent>>

As the ultraviolet absorbent, benzophenone-based ultraviolet absorbents, benzotriazole-based ultraviolet absorbents, salicylate-based ultraviolet absorbents, cyanoacrylate-based ultraviolet absorbents, nickel complex salt-based ultraviolet absorbents, and the like are suitably used.

[Ink Production Method]

An ink is produced by dispersing or dissolving, in an aqueous medium, a water-dispersible colorant, a water-soluble organic solvent, a surfactant, a penetrant and water, and further, if necessary, other components and further, as required, by stirring and mixing these components. The stirring and mixing can be perfumed by a sand mill, a homogenizer, a ball mill, a paint shaker, an ultrasonic dispersing machine or the like, and also performed by a stirrer using stirring blades, a magnetic stirrer, a high-speed dispersing machine or the like.
(Recording Medium)

As a recording medium for use in the recording method of the present embodiment, plain paper having no coating layer is preferably used. In particular, the recording medium is preferably plain paper having a sizing degree (JIS P8122) of 10S or higher and an air permeability (JIS P8117) of 5S to 50S, which is used for copy paper and the like.
(Recording Method)

Hereinafter, a recording method according to the present invention will be further described by way of preferred embodiments. A recording method of the present embodiment includes making the liquid composition of the present embodiment adhere onto a recording medium, and making an ink adhere to the recording medium onto which the liquid composition has been made to adhere. Each of these steps will be described hereinbelow.

<Step of Making Liquid Composition Adhere onto Recording Medium>

The step of making the liquid composition adhere onto a recording medium is not particularly limited, and a method may be used in which the liquid composition of the present embodiment is uniformly applied to a surface of a recording medium so that the liquid composition is attached thereon. Examples of such a method include a blade coating method, a gravure coating method, a gravure offset coating method, a bar coating method, a roll coating method, a knife coating method, an air-knife coating method, a comma coating method, a U-comma coating method, an AKKU coating method, a smoothing coating method, a micro gravure coating method, a reverse roll coating method, coating method using four rollers or five rollers, a dip coating method, a curtain coating method, a slide coating method, and a die coating method.

The wet adhesion amount of the liquid composition to the recording medium (i.e., an adhesion amount of the liquid composition before a recording medium is dried) in the step of making the liquid composition adhere onto a recording medium is preferably 0.1 g/m$^2$ to 30.0 g/m$^2$, and more preferably 0.2 g/m$^2$ to 10.0 g/m$^2$. When the wet adhesion amount is less than 0.1 g/m$^2$, the image quality (image density, color saturation, color bleeding, and feathering) of a recorded matter may not be improved. When the wet adhesion amount is more than 30.0 g/m$^2$, the texture of a recorded matter may be impaired and curling may occur. Note that, if necessary, a drying step may be provided to dry the recording medium onto which the liquid composition has been made to adhere. In this case, the recording medium may be dried by a roll heater, a drum heater, or hot air.

<Step of Making Ink Adhere onto Recording Medium>

The step of making an ink adhere onto a recording medium in the recording method of the present embodiment is a step in which an ink is applied to the recording medium onto which the liquid composition of the present embodiment has been made to adhere so that the ink is attached thereon, and thereby recording an image on the recording medium. The method of making an ink adhere onto a recording medium is not particularly limited and may be suitably selected in accordance with the intended use. Examples thereof include a method in which an impulse (energy) is applied to an ink by a predetermined device to discharge the ink so as to make the ink adhere onto the recording medium. More specifically, any known inkjet recording methods can be employed. Examples of such inkjet recording methods include an inkjet recording method through scanning with an inkjet recording head, and an inkjet recording method in which an image is recorded on a certain sheets of recording media by using a line-type inkjet recording head.

In the step of making the ink adhere to the recording medium, the driving method of a recording head serving as a unit of discharging an ink is not particularly limited, and may be suitably selected in accordance with the intended use. Examples of the driving method include a method of operating or using a piezoelectric element actuator using PZT (lead zirconate titanate) or thermal energy; a method of using an on-demand-type recording head using an actuator utilizing an electrostatic force; and a recording method using a continuous jetting type-charge controllable head. In the method of operating heat energy, it is said to be difficult to control the jetting of liquid droplets as desired, and the quality of images recorded is prone to significantly vary depending on the type of a recording medium used. This problem is, however, resolved by giving the liquid composition to the recording medium, and it is possible to obtain a stable and high quality recorded matter irrespective of the type of the recording medium used. Note that the step of making an ink adhere onto a recording medium exhibits its effect to a recording medium on which surface has been sufficiently dried as well as to a recording medium on which surface has not been dried.
(Recording Apparatus)

Figure 2:
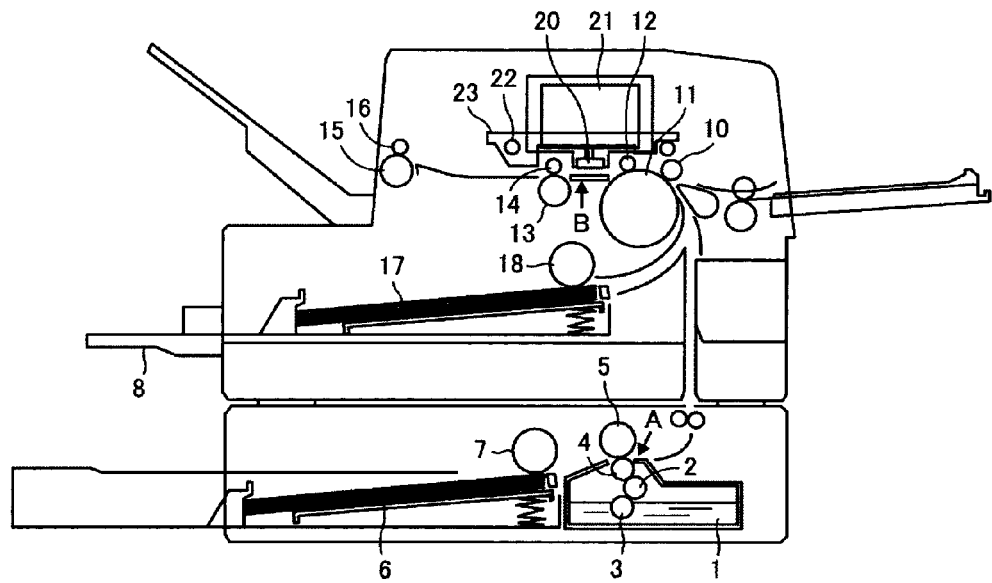
FIG. 2 is a cross-sectional side view illustrating one example of an apparatus for use in a recording method of the present embodiment.

A recording apparatus for recording an image by applying the liquid composition to a recording medium and applying an ink to the recording medium with the liquid composition having adhered to a surface thereof to thereby record an image on the recording medium will be described with reference to a specific example illustrated in FIG. 2. The recording apparatus illustrated in FIG. 2 is a recording apparatus which records an image by scanning the inkjet recording head. In the recording apparatus illustrated in FIG. 2, a recording medium 6 is sent out by a paper-feed roller 7, and a liquid composition 1 is uniformly and thinly applied onto the recording medium 6 by an applying roller 4 and a counter roller 5. The liquid composition 1 is pumped up by a pump-up roller 3 and uniformly applied to the applying roller 4 by a film thickness controlling roller 2. The recording medium 6 onto which the liquid composition 1 has been applied is then fed to a recording-scanning section where an inkjet recording head 20 is present. Since the length of a paper conveyance route from an end portion (A portion in FIG. 2) of the operation of applying the liquid composition to a start portion (B portion in FIG. 2) of recording-scanning is designed to be longer than the length of the recording medium in the feeding direction, application of the liquid composition can be finished at the point where the recording medium reaches the start portion of recording-scanning. In this case, since application of the liquid composition can be carried out before the inkjet recording head 20 starts scanning for recording and the recording medium 6 is intermittently conveyed, the liquid composition can be continuously applied to the recording medium 6 in a state where the conveyance speed of the recording medium 6 is constant and uniformly applied thereto without nonuniformity. Note that the recording apparatus example illustrated in FIG. 2 is configured so that the recording medium 6 onto which the liquid composition is necessary to be applied is supplied from a lower cassette, and other recording media 17 are supplied from an upper cassette, and thus this is advantageous to provide a longer conveyance route for a recording medium.

Figure 3:
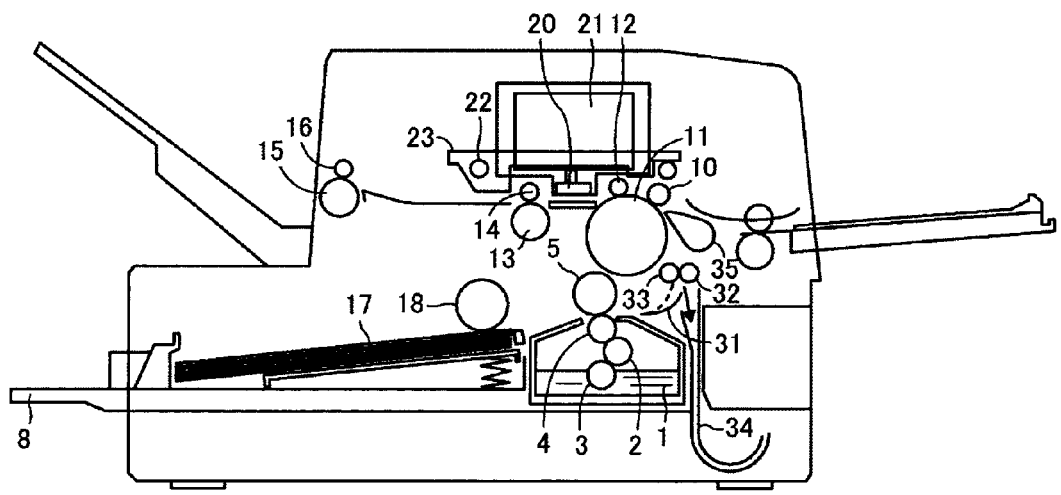
FIG. 3 is a cross-sectional side view illustrating another example of the apparatus for use in a recording method of the present embodiment.

FIG. 3 illustrates another example of the recording apparatus of the present embodiment. An exemplary recording apparatus illustrated in FIG. 3 is also a recording apparatus which records by scanning an inkjet recording head, and this recording apparatus is designed in more compact than the recording apparatus illustrated in FIG. 2. A recording medium 17 is sent out by a paper feeding roller 18, and a liquid composition 1 is uniformly applied in a thin thickness to the recording medium 17 by an applying roller 4 and a counter roller 5. The liquid composition 1 is pumped up by a pump-up roller 3 and uniformly applied to the applying roller 4 by a film thickness control roller 2. The recording medium 17 passes a recording-scanning portion where an inkjet recording head 20 is present while being applied thereto, and fed until the application of the liquid composition 1 to the recording medium 17 is completed. At the time when the application is completed, the recording medium 17 is returned back again until a tip portion thereof reaches a recording-scanning start portion. The completion of the application is detected by proving a known recording medium-detection unit (not illustrated) in the vicinity of the outlet of a liquid composition applying unit in the recording apparatus. This detection unit is not necessarily provided to the recording apparatus, and the recording apparatus may be systematically configured so that the feed amount of the recording medium 17 along the outer peripheral of the conveyance roller corresponds to the length of the recording medium 17 by preliminarily inputting information on the length of the recording medium 17 in a controller and controlling the number of revolutions of the motor.

When double-sided recording is performed, the recording medium 17 onto which the liquid composition 1 has been applied is conveyed again to the recording-scanning portion before the liquid composition is dried and solidified. At this point in time, the recording medium 17 is intermittently conveyed in synchronization with scanning of the inkjet recording head 20. When the recording medium 17 is made returned to the same route as that it is sent from first, the rear end of the recording medium 17 reversely enters to the liquid composition applying device. This causes failures such as coating nonuniformity, smear, and jamming of the recording medium 17. When the recording medium 17 is made returned back, the direction thereof is switched by a recording medium guide 31. That is, when the recording medium 17 is sent in the reverse direction after the liquid composition 1 is applied to the recording medium 17, the recording medium guide 31 is moved to a portion indicated by a dotted line in the figure by a known unit such as a soleide and a motor. With this, the recording medium 17 is conveyed to the position of a recording medium return guide 34, and thus it is possible to prevent occurrence of smear and jamming of the recording medium.

The step of making the liquid composition adhere to the recording medium is preferably performed at a constant linear speed of 10 mm/s to 1,000 mm/s. Therefore, in this exemplary recording apparatus, using sheets of a recording medium, when focused on a certain recording medium sheet, after the process of applying the liquid composition onto the recording medium is finished for the certain recording medium sheet, a process of making an ink adhere to a surface thereof and image processing is started. In such a recording apparatus, in most cases, the speed of applying a liquid composition is inconsistent with the speed of recording an image, and thus there is a time lag between a recording start portion and a recording end portion of recording sheets of paper, from the time when the liquid composition is applied to the recording medium to the time when the image is recorded. Even when the time lag is significant, in a liquid composition which contains a water-soluble organic solvent having a boiling point higher than that of water and low evaporation speed, and in which the water content ratio is adjusted so as to be an amount nearly in equilibrium with the water content in air under an environment a printer is used, evaporation of water is remarkably suppressed. Thus, a difference in image quality caused between a recording start portion and a recording end portion can be reduced to the level where it can be, at least, visually observed.

As clearly understood from the conveyance step of a recording medium in this recording apparatus, in most cases, there is a need to convey a recording medium to which a liquid composition is applied, through use of a unit for contacting the recording medium, such as a roller, a small roller, and guide. In this case, when the liquid composition having adhered to the recording medium is transferred to conveyance members, it may cause problems, for example, failures occur in the conveyance function, and smear is accumulated to cause degradation in quality of images. In this case, the occurrence of such problems is reduced by providing a wavy plate guide in a recording medium, providing a spur-shaped small roller, and/or using a water-repellent material for a roller surface.

To control the operation of a recording apparatus as illustrated in FIGS. 2 and 3, when a recording apparatus receives a printing direction from a host machine such as a personal computer, the recording apparatus starts a head cleaning work and a liquid composition applying work simultaneously, and at the time all preparations have finished, it starts recording operation. In this case, the transfer of image data may be even for one time scanning, even for a plurality of scanning times or even for one page. The operations of the head cleaning and ink jetting check are not necessarily required. In addition, the operations of head cleaning and ink jetting check and the image data processing and transfer of image data are not necessarily sequentially performed. It is possible for the recording apparatus to perform these operations in parallel, for example, the operations of coating of the liquid composition, head cleaning and ink jetting check and the image data processing and transfer of image data are made to start at the same time. In this way, by performing these processes in parallel, it is possible to record an image without substantially decreasing the through-put of the recording apparatus even when the recording apparatus (liquid composition applying unit) performs application of the liquid composition.

<<Supplemental Description>>

In the recording method of the above-mentioned embodiment, a predetermined ink is made to adhere on a recording medium onto which a predetermined liquid composition has been made to adhere, to thereby record an image. That is, the above-mentioned liquid composition is used as a pre-treatment liquid for recording, which, however, is not limited to the above-mentioned liquid composition. In this case, an image may be recorded by using the liquid composition as a post-treatment liquid for recording, and making the liquid composition adhere onto a recording medium onto which a predetermined ink has been made to adhere, and an image may be recorded by using the liquid composition as a recording treatment liquid and making a predetermined ink and the liquid composition adhere onto a recording medium at the same time.

EXAMPLES

Hereinafter, examples of the present invention will be specifically described, however, the present invention is not limited to these disclosed examples.

<<Production of Liquid Composition>>
<Production of Polyamine-Epihalohydrin Copolymer, or Polyamidepolyamine-Epihalohydrin Copolymer>

Production Example A-1

Polyamine-Epihalohydrin Copolymer

Into a 500 mL-four-necked flask equipped with a stirrer, a thermometer, a reflux condenser and a nitrogen introduction tube, 95.1 g of water and 131.8 g (0.8 moles) of 58% by mass an aqueous trimethylamine hydrochloride solution were charged, and 74.0 g (0.8 moles) of epichlorohydrin was added dropwise for 3 hours so as not to elevate the temperature of the mixture higher than 40° C., while introducing nitrogen. After the dropwise addition of the epichlorohydrin was finished, the flask was heated to 80° C. to allow the mixture to react for 1 hour. Thereafter, the flask was cooled down to 30° C., and 36.1 g (0.4 moles) of 50% by mass of aqueous dimethylamine solution and 14.8 g (0.2 moles) of calcium hydroxide were added in the flask, and then heated to 80° C. to allow the mixture to react for 1 hour. Thereafter, the reaction liquid was prepared with hydrochloric acid and water, so as to have a pH of 4.0 and a solid content concentration of 50% by mass. Thus, a copolymer represented by Formula (1), i.e., a polyamine-epihalohydrin copolymer of Production Example A-1 was produced.

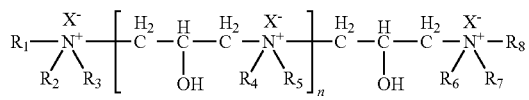

Formula (1)

in Formula (1), $R_1$ to $R_8$ may be identical to or different from each other, and each denote at least one of an alkyl group having 1 to 8 carbon atoms, a hydroxyalkyl group, an alkenyl group, and a benzyl group, X denotes a halogen atom (for example, F, Cl, Br, I), n denotes an integer of 1 or 2.

Production Example A-2

Polyamine-Epihalohydrin Copolymer

Into a 500 mL-four-necked flask equipped with a stirrer, a thermometer, a reflux condenser and a nitrogen introduction tube, 36.8 g of water, 157.6 g (0.8 moles) of 30% by mass aqueous trimethylamine solution, 36.1 g (0.4 moles) of 50% by mass aqueous dimethylamine solution, and 7.3 g (0.1 moles) of diethylamine were charged, and 92.5 g (1.0 mole) of epichlorohydrin was added dropwise for 4 hours so as not to elevate the temperature of the mixture higher than 40° C., while introducing nitrogen. After the dropwise addition of the epichlorohydrin was finished, the flask was heated to 80° C., and the mixture was allowed to react at 80° C. for 2 hour. Thereafter, the flask was cooled down to 30° C. Thereafter, the reaction liquid was prepared with hydrochloric acid and water, so as to have a pH of 3.9 and a solid content concentration of 50% by mass. Thus, a copolymer represented by the above Formula (1), i.e., a polyamine-epihalohydrin copolymer of Production Example A-2 was produced.

Production Example A-3

Polyamidepolyamine-Epihalohydrin Copolymer

Into a 3 L-four-necked round flask equipped with a stirrer, a thermometer, a condenser and a nitrogen introduction tube, 495 g (4.8 moles) of diethylenetriamine was charged, and 877 g (6.0 moles) of adipic acid was added with stirring. The flask was heated while generated water was removed from the system, followed by allowing the mixture to react at 150° C. for 5 hours, and gradually adding 1,000 g of water, to thereby obtain a polyamidepolyamine-containing liquid. The polyamidepolyamine-containing liquid had a solid content of 52.1% by mass. In the case where the polyamidepolyamine-containing liquid had a solid content of 50% by mass, it had a viscosity of 380 mPa·s at 25° C. Into a flask, 100 g of the polyamidepolyamine-containing liquid (0.214 moles of an amino group), 3.8 g (30% by equivalent) of acetic acid, and 4.3 g (15% by equivalent) of 30% by mass of aqueous sodium hydroxide solution were charged, and 6.7 g of water was added thereto, so that the polyamidepolyamine-containing liquid had 50% by mass of solid content. Next, into the flask, 19.8 g (100% by equivalent) of epichlorohydrin was added dropwise at 30° C. for 1 hour, followed by maintaining the resulting mixture at 30° C. for 1 hour, and 0.8 g (2% by equivalent) of sodium metabisulfite was added thereto, and the flask was maintained at 30° C. for 5 hours from the beginning of the dropwise addition of the epichlorohydrin. Next, 1.1 g (10% by equivalent) of 98% by mass sulfuric acid, and 127.0 g of water were added thereto, so that a solid content thereof had 30% by mass, followed by heating to 75° C. The resulting reaction liquid was maintained at 75° C. until the viscosity of the reaction liquid at 25° C. reached 300 mPa·s, and then 40.5 g of water was added thereto so as to obtain a solid content of 26% by mass, followed by cooling to 25° C. or lower. Thereafter, the pH of the reaction liquid was adjusted to 3.5 with 30% by mass of sulfuric acid, and to 3.0 with 88% by mass of formic acid, to thereby produce a copolymer having a repeating unit represented by Formula (2) or a copolymer obtained by polymerizing a monomer represented by Formula (3), a monomer represented by Formula (4) and a monomer represented by Formula (5), i.e., a polyamidepolyamine-epihalohydrin copolymer of Production Example A-3 having a solid content concentration of 25.0% by mass and a viscosity of 51.6 mPa·s at a solid content concentration of 15% by mass.

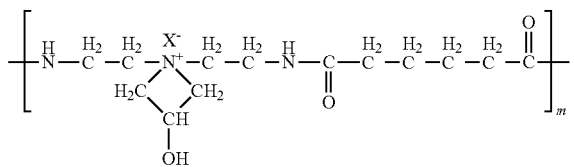

Formula (2)

in Formula (2), X denotes a halogen atom (for example, F, Cl, Br, I), and m denotes an integer of 1 or more. Both-terminal of the copolymer represented by Formula (2) may be a monomer constituting a repeating unit, a known initiator, or the like.

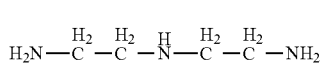

Formula (3)

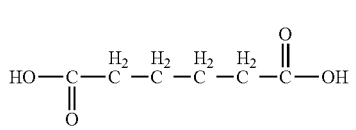

Formula (4)

-continued

Formula (5)

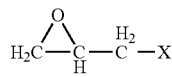

in Formula (5), X denotes a halogen atom (for example, F, Cl, Br, and I).

Production Example A-4

Polyamine-Epihalohydrin Copolymer

Into a 1 L-four-necked flask equipped with a stirrer, a thermometer, a reflux condenser and a nitrogen introduction tube, 443.85 parts by mass of water, and 41.27 parts by mass of diethylenetriamine were charged, and 111.04 parts by mass of epichlorohydrin was added dropwise for 1.5 hours so as not to elevate the temperature of the mixture higher than 40° C., while introducing nitrogen. After the dropwise addition of the epichlorohydrin was finished, 19.4 parts by mass of octahydro-4,7-methanoinden-1(2),5(6)-dimethanamine was added to the mixture, and stirred for 30 minutes, and then 18.51 parts by mass of epichlorohydrin was added dropwise thereto for half an hour, so as not to elevate the temperature of the mixture higher than 40° C., followed by heating the resulting mixture to 70° C., and maintaining it at 70° C. for 1.5 hours. Next, the pH of the mixture was adjusted to 7.5 with 30% by mass of aqueous sodium hydroxide solution, and the temperature of the resulting mixture was continuously maintained at 70° C. for 1.5 hours. The pH thereof was adjusted to 3.5 with 30% by mass of an aqueous sulfuric acid solution, followed by cooling to finish the reaction. The thus obtained reaction product was a copolymer containing a monomer represented by the above Formula (3) and a monomer represented by the above Formula (4) as monomer components, i.e., a polyamine-epihalohydrin copolymer of Production Example A-4 having a solid content concentration of 30.2% by mass, a viscosity of 76 mPa·s at solid content concentration of 10% by mass, and a pH of 3.9.

Production Example A-5

Polyamine-Epihalohydrin Copolymer

Into a 1 L-four-necked flask equipped with a stirrer, a thermometer, a reflux condenser and a nitrogen introduction tube, 657.2 parts by mass of water, 58.4 parts by mass of triethylenetetramine, and 108 parts by mass of 50% by mass dimethylamine were charged, and 192.4 parts by mass of epichlorohydrin was added dropwise for 1.5 hours so as not to elevate the temperature of the mixture higher than 40° C., while introducing nitrogen, followed by heating the resulting mixture to 70° C., and maintaining it at 70° C. for 1.5 hours. Next, the pH of the mixture was adjusted to 7.5 with 30% by mass of aqueous sodium hydroxide solution, and the temperature of the resulting mixture was continuously maintained at 70° C. for 1.5 hours. The pH thereof was adjusted to 3.5 with 30% by mass of an aqueous sulfuric acid solution, followed by cooling to complete the reaction. The thus obtained reaction product was a copolymer containing a monomer represented by the above Formula (5) as a monomer component, i.e., a polyamine-epihalohydrin copolymer of Production Example A-5 having a solid content of 29.9% by mass, a viscosity of 200 mPa·s (solid content concentration of 10% by mass) and a pH of 3.5.

<Production of Liquid Composition>

Each liquid composition was produced according to the following procedure. First, materials shown in Tables 1A and 1B were mixed, and stirred for 1 hour, so as to be uniformly mixed, thereby obtaining a pretreatment liquid. This pretreatment liquid was filtered under pressure through a polyvinylidene fluoride membrane filter having an average pore diameter of 5.0 μm to remove coarse particles and waste to thereby produce Liquid Compositions 1 to 13. Physical properties of Liquid Compositions 1 to 13 are shown in Table 2.

Surface tension: measured at 25° C. using an automatic surface tension meter (CBVP-Z, produced by Kyowa Interface Science Co., LTD.)

TABLE 1A

| | | Liquid Composition | | | | | |
|---|---|---|---|---|---|---|---|
| Component (% by mass) | | 1 | 2 | 3 | 4 | 5 | 6 |
| Organic acid ammonium | ammonium lactate (content: 75%) | | | | 6.67 | 6.67 | |
| | ammonium acetate (content: 97%) | | | | | | 5.15 |
| Inorganic metal salt compound | calcium nitrate | | | | | | |
| Water-soluble cationic polymer | A-1 | 20.00 | | | 20.00 | 20.00 | |
| | A-2 | | | | | | 20.00 |
| | A-3 | | 40.00 | | | | |
| | A-4 | | | | | | |
| | A-5 | | | | | | |
| | WS-4020 | | | 40.00 | | | 20.00 |
| | DM-283P | | | | | | |
| Water-soluble organic solvent | 3-methyl-1,3-butanediol | 10.00 | 10.00 | 20.00 | 10.00 | 10.00 | 10.00 |
| | glycerin | 20.00 | 20.00 | 10.00 | 20.00 | 20.00 | 20.00 |
| Penetrant | 2-ethyl-1,3-hexanediol | 1.00 | 1.00 | 1.00 | 1.00 | 1.00 | 1.00 |
| Anti-foaming agent | 2,4,7,9-tetramethyldecane-4,7-diol | 0.10 | 0.10 | 0.10 | 0.10 | 0.10 | |
| | 2,5,8,11-tetramethyldodecane-5,8-diol | | | | 0.10 | | 0.10 |
| | KM-72F | | | | | | |

TABLE 1A-continued

| Component (% by mass) | | Liquid Composition | | | | | |
|---|---|---|---|---|---|---|---|
| | | 1 | 2 | 3 | 4 | 5 | 6 |
| Fluorine-based surfactant | Compound represented by Formula (F-1)-e | 0.20 | | | 0.20 | | |
| | Compound represented by Formula (F-2) | | 0.20 | | | | 0.30 |
| | Compound represented by Formula (F-3-1) | | | 0.10 | | | |
| | Compound represented by Formula (F-4-1) | | | | | 0.10 | |
| Surfactant | SOFTANOL EP7025 | | | | | | |
| Anti-fungal agent | PROXEL GXL | 0.05 | 0.05 | 0.05 | 0.05 | 0.05 | 0.05 |
| Anti-corrosive agent | 1,2,3-benzotriazole | 0.05 | 0.05 | 0.05 | 0.05 | 0.05 | 0.05 |
| | Pure water | balance | balance | balance | balance | balance | balance |
| | Total (% by mass) | 100 | 100 | 100 | 100 | 100 | 100 |

TABLE 1B

| Component (% by mass) | | Liquid Composition | | | | | | |
|---|---|---|---|---|---|---|---|---|
| | | 7 | 8 | 9 | 10 | 11 | 12 | 13 |
| Organic acid ammonium | ammonium lactate (content: 75%) | 6.67 | 6.67 | | | | | 6.67 |
| | ammonium acetate (content: 97%) | | | 10.31 | | | | |
| Inorganic metal salt compound | calcium nitrate | | | | | 20.41 | | |
| Water-soluble cationic polymer | A-1 | | | | 20.00 | | | 20.00 |
| | A-2 | 20.00 | | | | | | |
| | A-3 | | | | | | | |
| | A-4 | | 33.33 | | | | | |
| | A-5 | | | 33.33 | | | | |
| | WS-4020 | | | | | | 20.00 | |
| | DM-283P | | | | | | | |
| Water-soluble organic solvent | 3-methyl-1,3-butanediol | 15.00 | 15.00 | 15.00 | 10.00 | 15.00 | 10.00 | 10.00 |
| | glycerin | 20.00 | 20.00 | 20.00 | 20.00 | 15.00 | 20.00 | 20.00 |
| Penetrant | 2-ethyl-1,3-hexanediol | 1.00 | 1.00 | 1.00 | 1.00 | | 1.00 | 1.00 |
| Anti-foaming agent | 2,4,7,9-tetramethyldecane-4,7-diol | 0.10 | 0.10 | 0.10 | 0.10 | | 0.10 | |
| | 2,5,8,11-tetramethyldodecane-5,8-diol | | | | | | | |
| | KM-72F | | | | | | | 0.10 |
| Fluorine-based surfactant | Compound represented by Formula (F-1)-e | 0.20 | 0.20 | 0.20 | | | 0.20 | 0.20 |
| | Compound represented by Formula (F-2) | | | | | | | |
| | Compound represented by Formula (F-3-1) | | | | | | | |
| | Compound represented by Formula (F-4-1) | | | | | | | |
| Surfactant | SOFTANOL EP7025 | | | | 0.50 | 0.50 | | |
| Anti-fungal agent | PROXEL GXL | 0.05 | 0.05 | 0.05 | 0.05 | 0.05 | 0.05 | 0.05 |
| Anti-corrosive agent | 1,2,3-benzotriazole | 0.05 | 0.05 | 0.05 | 0.05 | 0.05 | 0.05 | 0.05 |
| | Pure water | balance | balance | balance | balance | balance | balance | balance |
| | Total (% by mass) | 100 | 100 | 100 | 100 | 100 | 100 | 100 |

Abbreviations in Tables 1A and 1B denote the following meanings:

ammonium lactate: produced by Kanto Chemical Co., Inc., purity: 73% to 77% ammonium acetate: produced by Kanto Chemical Co., Inc., purity: 97% or more

WS-4020: polyamide-epichlorohydrin copolymer (produced by SEIKO PMC CORPORATION, effective component: 25% by mass)

SOFTANOL EP-7025: polyoxyalkylene alkylether (produced by Nippon Shokubai Co., Ltd., component: 100% by mass)

PROXEL GXL: anti-fungal agent mainly containing 1,2-benzisothiazolin-3-one (produced by Avicia Co., component: 20% by mass, containing dipropylene glycol)

SHAROLL DM-283P: quaternary ammonium salt type cationic polymer compound (produced by DAI-ICHI KOGYO SEIYAKU CO., LTD., an aqueous solution containing 50% by mass of effective component, molecular weight: about 28,000) represented by the following Formula (8).

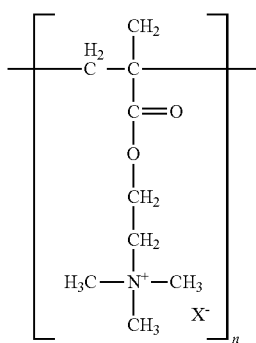

Formula (8)

in Formula (8), X denotes a halogen atom, and n denotes an integer or 1 or more.

TABLE 2

| Liquid composition | pH | Surface tension (mN/m) |
|---|---|---|
| 1 | 6.44 | 20.6 |
| 2 | 5.78 | 20.8 |
| 3 | 5.19 | 25.7 |
| 4 | 6.43 | 20.7 |
| 5 | 6.45 | 26.2 |
| 6 | 6.96 | 20.9 |
| 7 | 6.24 | 21.4 |
| 8 | 5.98 | 20.5 |
| 9 | 6.28 | 20.7 |
| 10 | 6.17 | 30.9 |
| 11 | 6.82 | 31.3 |
| 12 | 4.89 | 20.9 |
| 13 | 6.47 | 20.9 |

<<Production of Ink>>
<Production of Resin Coating Pigment Dispersion>
(Production of Resin Coating Polymer)

Into a reaction vessel, 20 parts by mass of methyl ethyl ketone, 0.03 parts by mass of a polymerization chain transfer agent (2-mercaptoethanol), and 10% by mass of each monomer shown in Table 3 (represented by parts by mass) were charged, mixed, and then the reaction vessel was sufficiently purged with nitrogen gas, to thereby obtain a mixture solution. Meanwhile, in a dropping funnel, remained 90% by mass of each of the monomers shown in Table 3 (represented by parts by mass) was charged, and subsequently 0.27 parts by mass of a polymerization chain transfer agent (2-mercaptoethanol), 60 parts by mass of methyl ethyl ketone and 1.2 parts by mass of 2,2'-azobis(2,4-dimethylvaleronitrile) were added, mixed, and then the dropping funnel was sufficiently purged with nitrogen gas, to thereby obtain a mixture solution.

The temperature of the mixture solution in the reaction vessel was increased to 75° C. while being stirred under a nitrogen atmosphere, and the mixture solution in the dropping funnel was gradually added dropwise to the reaction vessel for 3 hours. After completion of the dropping, the temperature of the resulting mixture solution was maintained at 75° C. for 2 hours. Subsequently, a solution, in which 0.3 parts by mass of 2,2'-azobis(2,4-dimethylvaleronitrile) were dissolved in 5 parts by mass of methyl ethyl ketone, was added to the mixture solution, and the system was further aged at 75° C. for 2 hours and at 85° C. for 2 hours to thereby obtain each solution of Resin Coating Polymers 1 to 4.

Part of the resulting resin coating polymer solution was dried at 105° C. for 2 hours under reduced pressure and isolated by removing the solvent therefrom. A weight average molecular weight of the resulting resin coating polymer was measured by gel permeation chromatography, using polystyrene serving as a standard material, 60 mmol/L of phosphoric acid and 50 mmol/L of lithium bromide-containing dimethylformamide each serving as a solvent.

TABLE 3

| | | Resin coating polymer | | | |
|---|---|---|---|---|---|
| | Monomer (% by mass) | 1 | 2 | 3 | 4 |
| (A) | ethoxy polyethylene glycol monomethacrylate | 10 | | | |
| | octoxy polyethylene glycol monomethacrylate | | 10 | | |
| | octoxy polyethylene glycol-polypropylene glycol monomethacrylate | | | 10 | |
| | lauroxy polyethylene glycol monomethacrylate | | | | 10 |
| (B) | methacrylic acid | 12 | 12 | 14 | 14 |
| (C) | 2-ethylhexyl methacrylate | 22 | 22 | 20 | 20 |
| | styrene monomer | 46 | 46 | 46 | 46 |
| | styrene macromer | 10 | 10 | 10 | 10 |
| Weight average molecular weight | | 32,000 | 41,000 | 40,000 | 30,000 |
| Neutralization degree (%) | | 90 | 90 | 90 | 90 |

Note that details of individual compounds shown in Table 3 are as follows:

octoxypolyethylene glycol-polyproplylene glycol monomethacrylate: a monomer to which an oxyethylene group and an oxypropylene group are randomly added (average number of moles added of polyethylene glycol: 4, average number of moles added of polypropylene glycol: 2)

methacrylic acid: produced by Mitsubishi Gas Chemical Co, Inc., product name: GE-110 (MAA)

2-ethylhexyl methacrylate: produced by Mitsubishi Rayon Co., Ltd., product name: ACRYESTER EH styrene monomer: produced by Nippon Steel Chemical Co., Ltd., product name: STYRENEMONOMER styrene macromer: produced by TOAGOSEI Co., Ltd., product name: AS-6S (styrene macromer), number average molecular weight: 6,000

(Production of Resin Coating Pigment Dispersion)

To 77 parts by mass of a solution, in which the concentration of each of the resin coating polymers 1 to 4 obtained in the above-mentioned production example was adjusted to 50% by mass with methyl ethyl ketone, 90 parts by mass of methyl ethyl ketone and a predetermined amount of a neutralizing agent (5N aqueous sodium hydroxide solution) were added to neutralize the methacrylic acid (neutralization degree: 90%). Subsequently, 370 parts by mass of ion exchanged water were added thereto and further, 90 parts by mass of a pigment shown in Table 4 were added as a colorant thereto, and the components were mixed using a homogenizer, followed by 20 passes of dispersion treatment by a dispersing machine (MICROFLUIDIZER M-140K, 150 MPa). Note that the resin coating pigment dispersions is using Carbon Black NIPEX 150 were subjected to 5 passes of dispersion treatment with the dispersing machine.

To the resulting water dispersion, 100 parts by mass of ion exchanged water were added, stirred, and the methyl ethyl ketone was removed therefrom at 60° C. under reduced pressure. Further, part of water was removed from the water dispersion, and then filtered through a needle-less syringe (capacity: 25 mL) (produced by TERUMO Corporation) to which a 5 μm-filter (acetyl cellulose film, outer diameter: 2.5 cm, produced by FUJIFILM Corporation) was attached to remove coarse particles therefrom, thereby obtaining aqueous dispersions of Production Examples B-1 to B-4 (solid content: 25% by mass).

TABLE 4

| Production Example | Resin coating polymer | Pigment |
|---|---|---|
| B-1 | 1 | Carbon Black NIPEX150 (produced by Degussa HÜLS AG) |
| B-2 | 2 | C.I. Pigment Yellow 74 (produced by Dainichiseika Color & Chemicals Mfg. Co., Ltd.) |
| B-3 | 3 | C.I. Pigment Red 122 (produced by Dainichiseika Color & Chemicals Mfg. Co., Ltd.) |
| B-4 | 4 | C.I. Pigment Blue 15:3 (produced by Dainichiseika Color & Chemicals Mfg. Co., Ltd.) |

<Production of Pigment-Surfactant Dispersion>

Production Example C-1

Black Pigment-Surfactant Dispersion

| | |
|---|---|
| Carbon Black (NIPEX150, produced by Degussa HÜLS AG) | 15.0 parts by mass |
| polyoxyethylene styrene phenylether sulfonate ammonium (anionic surfactant, produced by DAI-ICHI KOGYO SEIYAKU CO., LTD., HITENOL NF-17) | 6.0 parts by mass |
| ion exchanged water | 79.0 parts by mass |

First, the surfactant listed above was dissolved in ion exchanged water, the carbon black was mixed therewith, and the sufficiently wetted. Then, the system was subjected to 5 passes of dispersion treatment with MICROFLUIDIZER M-140K, 150 MPa (manufactured by Mizuho Kogyo K.K.) to obtain a primary pigment dispersion. Next, to the primary pigment dispersion, 2.13 parts by mass of a water-soluble polyurethane resin (TAKELAC W-5661, produced by Mitsui Chemicals, Inc., effective component: 35.2% by mass, acid value: 40 mgKOH/g, molecular weight: 18,000) were added as a water-soluble polymer compound aqueous solution, and sufficiently stirred to thereby obtain a black pigment-surfactant dispersion of Production Example C-1. An average particle diameter ($D_{50}$) of the pigment dispersion in the resulting black pigment-surfactant dispersion was 132 nm as measured with a particle size distribution measurement device (manufactured by NIKKISO Co., Ltd., NANOTRACK UPA-EX150).

Production Example C-2

Yellow Pigment-Surfactant Dispersion

| | |
|---|---|
| monoazo yellow pigment (C.I. Pigment Yellow 74, produced by Dainichiseika Color & Chemicals Mfg. Co., Ltd.) | 20.0 parts by mass |
| polyoxyethylene-β-naphthylether (nonionic surfactant, produced by TAKEMOTO OIL & FAT Co., RT-100, HLB value = 18.5) | 7.0 parts by mass |
| ion exchanged water | 73.0 parts by mass |

First, the surfactant listed above was dissolved in ion exchanged water, the pigment listed above was mixed therewith, and then sufficiently wetted. Then, the system was dispersed at 2,000 rpm for 2 hours by a wet-process dispersing machine (DYNOMILL KDL A Model, manufactured by WAB) which was filled with zirconia beads having a diameter of 0.5 mm, to obtain a primary pigment dispersion. Next, to the primary pigment dispersion, 2.84 parts by mass of a water-soluble polyurethane resin (TAKELAC W-5661, produced by Mitsui Chemicals, Inc., effective component: 35.2% by mass, acid value: 40 mgKOH/g, molecular weight: 18,000) were added as a water-soluble polymer compound aqueous solution, and sufficiently stirred to thereby obtain a yellow pigment-surfactant dispersion of Production Example C-2. An average particle diameter ($D_{50}$) of the pigment dispersion in the resulting yellow pigment-surfactant dispersion was 76 nm as measured with a particle size distribution measurement device (manufactured by NIKKISO Co., Ltd., NANOTRACK UPA-EX150).

Production Example C-3

Magenta Pigment-Surfactant Dispersion

| | |
|---|---|
| quinacridone pigment (C.I. Pigment Red 122, produced by Dainichiseika Color & Chemicals Mfg. Co., Ltd.) | 20.0 parts by mass |
| polyoxyethylene-β-naphthylether (nonionic surfactant, produced by TAKEMOTO OIL & FAT Co., RT-100, HLB value = 18.5) | 7.0 parts by mass |
| ion exchanged water | 73.0 parts by mass |

A magenta pigment-surfactant dispersion of Production Example C-3 was produced in the same manner as in a yellow pigment-surfactant dispersion of Production Example C-2, except that the pigment was changed to quinacridone pigment. An average particle diameter ($D_{50}$) of the pigment dispersion in the resulting magenta pigment-surfactant dispersion was 86 nm as measured with a particle size distribution measurement device (manufactured by NIKKISO Co., Ltd., NANOTRACK UPA-EX150).

Production Example C-4

Cyan Pigment-Surfactant Dispersion

| | |
|---|---|
| phthalocyanine pigment (C.I. Pigment Blue 15:3, produced by Dainichiseika Color & Chemicals Mfg. Co., Ltd.) | 20.0 parts by mass |
| polyoxyethylene-β-naphthylether (nonionic surfactant, produced by TAKEMOTO OIL & FAT Co., RT-100, HLB value = 18.5) | 7.0 parts by mass |
| ion exchanged water | 73.0 parts by mass |

A cyan pigment-surfactant dispersion of Production Example C-4 was produced in the same manner as in a yellow pigment-surfactant dispersion of Production Example C-2, except that the pigment was changed to phthalocyanine pigment. An average particle diameter ($D_{50}$) of the pigment dispersion in the resulting cyan pigment-surfactant dispersion was 106 nm as measured with a particle size distribution measurement device (manufactured by NIKKISO Co., Ltd., NANOTRACK UPA-EX150).

<Preparation of Ink>

Each inkjet ink was produced according to the following procedure. First, a water-soluble organic solvent, a penetrant, a surfactant, an anti-fungal agent and water shown in Tables 5-1 and 5-2 were mixed and stirred for 1 hour so as to be uniformly mixed. In addition, depending on the mixture liquid, a water-dispersible resin was added, and stirred for 1 hour. Further, the pigment dispersion, an anti-foaming agent and a pH adjustor were added to the mixture liquid and stirred for 1 hour. This dispersion liquid was filtered under pressure through a polyvinylidene fluoride-membrane filter having an average pore diameter of 5.0 μm to remove coarse particles and waste therefrom, thereby producing Inks (K1 to K4, Y1 to Y4, M1 to M4, and C1 to C4) shown in Tables 5-1 and 5-2.

TABLE 5-1

| | | Ink | | | | | | | |
|---|---|---|---|---|---|---|---|---|---|
| | Component (% by mass) | K1 | Y1 | M1 | C1 | K2 | Y2 | M2 | C2 |
| Pigment dispersion | Production Ex. B-1 | 45.71 | | | | | | | |
| | Production Ex. B-2 | | 28.57 | | | | | | |
| | Production Ex. B-3 | | | 45.71 | | | | | |
| | Production Ex. B-4 | | | | 28.57 | | | | |
| | Production Ex. C-1 | | | | | 53.33 | | | |
| | Production Ex. C-2 | | | | | | 25.00 | | |
| | Production Ex. C-3 | | | | | | | 40.00 | |
| | Production Ex. C-4 | | | | | | | | 25.00 |
| Water-dispersible resin | acryl-siliconeresin emulsion | | | | | 2.50 | 3.75 | 2.50 | 3.75 |
| Water-soluble organic solvent | 1,3-butanediol | | 13.00 | 18.00 | 19.00 | | 26.00 | 22.0 | 25.00 |
| | 3-methyl-1,3-butanediol | 16.00 | | | | 15.00 | | | |
| | glycerin | 16.00 | 26.00 | 18.00 | 19.00 | 15.00 | 13.00 | 11.00 | 12.50 |
| Penetrant | 2-ethyl-1,3-hexanediol | 2.00 | 2.00 | 2.00 | 2.00 | | | | |
| | 2,2,4-trimethyl-1,3-pentanediol | | | | | 2.00 | 2.00 | 2.00 | 2.00 |
| Anti-foaming agent | 2,4,7,9-tetramethyldecane-4,7-diol | 0.40 | | | | 0.25 | 0.25 | 0.25 | 0.25 |
| | 2,5,8,11-tetramethyldodecane-5,8-diol KM-72F | | 0.40 | 0.40 | 0.40 | | | | |
| Fluorine-based surfactant | Compound represented by (F-1)-e | 0.10 | 0.10 | 0.10 | 0.10 | | | | |
| | Compound represented by (F-2) | | | | | 0.05 | 0.05 | 0.05 | 0.05 |
| | Compound represented by (F-3-1) | | | | | | | | |
| | Compound represented by (F-4-1) | | | | | | | | |
| Anti-fungal agent | PROXEL GXL | 0.05 | 0.05 | 0.05 | 0.05 | 0.05 | 0.05 | 0.05 | 0.05 |
| pH adjustor | 2-amino-2-ethyl-1,3-propanediol | 0.30 | 0.40 | 0.40 | 0.40 | 0.60 | 0.30 | 0.30 | 0.30 |
| | Pure water | balance | balance | balance | balance | balance | balance | balance | balance |
| | Total (% by mass) | 100 | 100 | 100 | 100 | 100 | 100 | 100 | 100 |

TABLE 5-2

| | | Ink | | | | | | | |
|---|---|---|---|---|---|---|---|---|---|
| | Component (% by mass) | K3 | Y3 | M3 | C3 | K4 | Y4 | M4 | C4 |
| Pigment dispersion | Production Ex. B-1 | | | | | 22.86 | | | |
| | Production Ex. B-2 | | | | | | 5.71 | | |
| | Production Ex. B-3 | | | | | | | 9.14 | |
| | Production Ex. B-4 | | | | | | | | 5.71 |
| | Production Ex. C-1 | | | | | 26.67 | | | |
| | Production Ex. C-2 | | | | | | 20.00 | | |
| | Production Ex. C-3 | | | | | | | 32.00 | |
| | Production Ex. C-4 | | | | | | | | 20.00 |
| | Black self-dispersible pigment dispersion (CAB-O-JET300) | 53.33 | | | | | | | |
| | Yellow self-dispersible pigment dispersion (CAB-O-JET270) | | 45.45 | | | | | | |

TABLE 5-2-continued

| | | Ink | | | | | | | |
|---|---|---|---|---|---|---|---|---|---|
| | Component (% by mass) | K3 | Y3 | M3 | C3 | K4 | Y4 | M4 | C4 |
| | Magenta self-dispersible pigment dispersion (CAB-O-JET260) | | | 54.55 | | | | | |
| | Cyan self-dispersible pigment dispersion (CAB-O-JET250) | | | | 45.45 | | | | |
| Water-soluble organic solvent | 1,3-butanediol | | 27.50 | 26.00 | 27.60 | | 25.00 | 22.00 | 24.00 |
| | 3-methyl-1,3-butanediol | 16.50 | | | | 15.00 | | | |
| | glycerin | 16.50 | 13.75 | 13.00 | 13.80 | 15.50 | 12.50 | 11.00 | 12.00 |
| Penetrant | 2-ethyl-1,3-hexanediol | 2.00 | 2.00 | 2.00 | 2.00 | 2.00 | 2.00 | 2.00 | 2.00 |
| | 2,2,4-trimethyl-1,3-pentanediol | | | | | | | | |
| Anti-foaming agent | 2,4,7,9-tetramethyldecane-4,7-diol | | | | | 0.25 | 0.25 | 0.25 | 0.25 |
| | 2,5,8,11-tetramethyldodecane-5,8-diol | | | | | | | | |
| | KM-72F | 0.10 | 0.10 | 0.10 | 0.10 | | | | |
| Fluorine-based surfactant | Compound represented by (F-1)-e | | | | | 0.05 | 0.05 | 0.05 | 0.05 |
| | Compound represented by (F-2) | | | | | | | | |
| | Compound represented by (F-3-1) | 0.05 | | | | | | | |
| | Compound represented by (F-4-1) | | 0.05 | 0.05 | 0.05 | | | | |
| Anti-fungal | PROXEL GXL | 0.05 | 0.05 | 0.05 | 0.05 | 0.05 | 0.05 | 0.05 | 0.05 |
| pH adjustor | 2-amino-2-ethyl-1,3-propanediol | 0.60 | 0.30 | 0.30 | 0.30 | 1.20 | 0.30 | 0.30 | 0.30 |
| | Pure water | balance | balance | balance | balance | balance | balance | balance | balance |
| | Total (% by mass) | 100 | 100 | 100 | 100 | 100 | 100 | 100 | 100 |

Abbreviations in Tables 5-1 and 5-2 denote the following meanings:

CAB-O-JET 260: produced by Cabot Corporation, pigment solid content: 11% by mass, self-dispersible magenta pigment CAB-O-JET 250: produced by Cabot Corporation, pigment solid content: 11% by mass, self-dispersible cyan pigment CAB-O-JET 270: produced by Cabot Corporation, pigment solid content: 11% by mass, self-dispersible yellow pigment CAB-O-JET 300: produced by Cabot Corporation, pigment solid content: 15% by mass, self-dispersible black pigment acryl-silicone resin emulsion: produced by Showa High Polymer Co., Ltd., POLYZOLE ROY6312, solid content: 40% by mass, average particle diameter: 171 nm, minimum film-forming temperature (MFT): 20° C.

PROXEL GXL: anti-fungal agent mainly containing 1,2-benzisothiazolin-3-one (produced by Avicia Co., component: 20% by mass, containing dipropylene glycol)

KM-72F: self-emulsified type silicone anti-foaming agent (produced by Shin-Etsu silicone Corp., component: 100% by mass)

Next, each of the inks produced as described above was evaluated according to the following evaluation methods. The evaluation results are shown in Table 6.

Average particle diameter ($D_{50}$): measured at 25° C. with a particle size distribution measurement device (NANOTRACK UPA-EX150, manufactured by NIKKISO Co., Ltd.)

Viscosity: measured at 25° C. with a viscometer (RE-550L, manufactured by TOKI SANGYO Co., Ltd.)

Surface tension: measured at 25° C. with an automatic surface tension meter (CBVP-Z, manufactured by Kyowa Interface Science Co., LTD.)

TABLE 6

| | Physical Properties of Ink | | |
|---|---|---|---|
| | Average particle diameter $D_{50}$ (nm) | Viscosity (mPa·s) | Surface tension (mN/m) |
| K1 | 79.5 | 8.10 | 21.5 |
| Y1 | 95.6 | 7.98 | 21.0 |
| M1 | 95.9 | 8.03 | 21.3 |
| C1 | 81.3 | 8.00 | 20.9 |
| K2 | 133.3 | 8.08 | 22.4 |
| Y2 | 82.4 | 8.00 | 21.7 |
| M2 | 92.6 | 8.09 | 21.6 |
| C2 | 108.6 | 8.14 | 21.6 |
| K3 | 110.4 | 6.25 | 24.9 |
| Y3 | 92.8 | 6.12 | 25.1 |
| M3 | 135.2 | 6.41 | 25.0 |
| C3 | 130.1 | 6.26 | 25.2 |
| K4 | 124.1 | 7.92 | 24.5 |
| Y4 | 84.1 | 7.85 | 23.5 |
| M4 | 94.5 | 7.88 | 24.7 |
| C4 | 98.8 | 7.89 | 24.7 |

<<Step of Making Liquid Composition Adhere onto Recording Medium>>

In Examples and Comparative Examples other than Comparative Examples 1 to 4, each of Liquid Compositions 1 to 13 shown in Table 7 was applied, in an adhesion amount of 0.8 g/m², to the following recording medium by a roll coating method, using the recording apparatus illustrated in FIG. 2 or FIG. 3, and then naturally dried.

Recording medium: recycle PPC produced by DAIO PAPER CORPORATION (recycled paper), basis weight: 66.5 g/m², compounding ratio of recycled fiber 70% or higher, sizing degree: 17 sec., and air permeability: 35 sec.

<<Step of Making Ink Adhere onto Recording Medium>>

In the step of making an ink adhere onto a recording medium, concerning each Examples and Comparative Examples, using an inkjet recording apparatus (IPSIO GX5000, manufactured by Ricoh Company, Ltd.) to which an ink set described in Table 7 had been mounted, an image was recorded by applying an ink onto the recording medium shown in Table 7 which had been produced by the step of making a liquid composition onto the recording medium, and thereby recording an image. Concerning Comparative Examples 1 to 4 in Table 7, each ink was applied to a recording medium (RECYCLE PPC) on which surface no liquid composition was applied, thereby recording an image. Since images recorded differ for every evaluation item, and thus the details of the images will be described in "Evaluation of Recorded Matter" below. Note that at the time of applying an ink to the recording medium, the driving voltage of a piezoelectric element was varied so that the discharge amounts of the individual inks were equal to each other, under the environment of 23° C.±0.5° C. and 50% RH±5% RH. In addition, the printing mode when each ink was applied was set to "Plain Paper/Clear Mode, Color Matching: OFF".

TABLE 7

|  | Liquid composition | Ink set |
|---|---|---|
| Ex. 1 | 1 | 1 |
| Ex. 2 | 2 | 2 |
| Ex. 3 | 3 | 3 |
| Ex. 4 | 4 | 1 |
| Ex. 5 | 5 | 4 |
| Ex. 6 | 6 | 1 |
| Ex. 7 | 7 | 4 |
| Ex. 8 | 8 | 1 |
| Ex. 9 | 9 | 4 |
| Ex. 10 | 10 | 1 |
| Ex. 11 | 6 | 1 |
| Ex. 12 | 6 | 2 |
| Ex. 13 | 6 | 3 |
| Ex. 14 | 13 | 1 |
| Comp. Ex. 1 |  | 1 |
| Comp. Ex. 2 |  | 2 |
| Comp. Ex. 3 |  | 3 |
| Comp. Ex. 4 |  | 4 |
| Comp. Ex. 5 | 11 | 4 |
| Comp. Ex. 6 | 12 | 1 |

Note that, each of the ink sets shown in Table 7 is composed of the inks described below.

Ink Set 1: Ink M1, Ink C1, Ink Y1, Ink K1
Ink Set 2: Ink M2, Ink C2, Ink Y2, Ink K2
Ink Set 3: Ink M3, Ink C3, Ink Y3, Ink K3
Ink Set 4: Ink M4, Ink C4, Ink Y4, Ink K4

<<Evaluation of Recorded Matter>>

Recording matters obtained using Examples and Comparative Examples were evaluated for the following items.

<Image Density>

Concerning a recorded matter which was recorded by means of MICROSOFT Word 2000, in which a character "■" was recorded (font size: 64 point), the density of the "■" portion on a recorded surface was measured with an X-Rite 938 (produced by X-Rite). The image density was evaluated in such a manner that one color which was evaluated worst among four colors was selected, and then evaluated based on the following criteria.

[Evaluation Criteria]
A: Black: 1.45 or higher,
   Yellow: 0.90 or higher,
   Magenta: 1.15 or higher, or
   Cyan: 1.20 or higher.
B: Black: 1.35 or higher but lower than 1.45,
   Yellow: 0.85 or higher but lower than 0.90,
   Magenta: 1.05 or higher but lower than 1.15, or
   Cyan: 1.10 or higher but lower than 1.20.
C: Black: lower than 1.35,
   Yellow: lower than 0.85,
   Magenta: lower than 1.05, or
   Cyan: lower than 1.10.

<Strikethrough>

A recorded matter which was recorded by means of MICROSOFT Word 2000, in which a character "■" was recorded (font size: 64 point), was measured for colorimetry at its rear surface to the recorded surface where "■" was recorded, by an X-Rite 938. A density obtained by subtracting the density of the background of the recording medium was regarded as "strikethrough density". The measured strikethrough density was judged in such a manner that one color which was evaluated worst among four colors was selected, and then evaluated based on the following criteria.

[Evaluation Criteria]
A: Black: lower than 0.09,
   Yellow: lower than 0.08,
   Magenta: lower than 0.09, or
   Cyan: lower than 0.09.
B: Black: 0.09 or higher but lower than 0.10,
   Yellow: 0.08 or higher but lower than 0.09,
   Magenta 0.09 or higher but lower than 0.10, or
   Cyan: 0.09 or higher but lower than 0.10.
C: Black: 0.10 or higher,
   Yellow: 0.09 or higher,
   Magenta: 0.10 or higher, or
   Cyan: 0.10 or higher.

<Color Bleeding>

Concerning a recorded matter on which surface 0.5-mm line images for each color of magenta, cyan and black were recorded on a yellow solid image, occurrence of bleeding at color boundary where different color inks were recorded was visually observed. Similarly to the above, a recorded matter on which surface 0.5-mm line images for each color of magenta, yellow and black were recorded on a cyan solid image, and a recorded matter on which surface 0.5-mm line images for each color of cyan, yellow and black were recorded on a magenta solid image were also visually observed for presence or absence of bleeding at color boundary.

[Evaluation Criteria]
A: No problem at all
B: Slightly occurred but no problem
C: Occurred, problematic <Feathering>

Concerning a recorded matter which was recorded by means of MICROSOFT Word 2000, in which a black character shown below was recorded (font size: 6 point), occurrence of feathering in the following character portion was visually observed.

轟

[Evaluation Criteria]
A: No problem at all
B: Slightly occurred but no problem
C: Occurred in small percentage, problematic
D: Occurred, problematic <White-Out>

Concerning a recorded matter which was recorded by means of MICROSOFT Word 2000, in which a character "■" was recorded in each color of yellow, magenta, cyan, and black (font size: 64 point), the "■" portion was visually observed, and presence or absence of white-out (void portions in the character "■") was evaluated.

[Evaluation Criteria]
A: No problem at all
B: Slightly observed, but no problem
C: Observed, but within an allowable range
D: Problematic <Abrasion Resistance>

A recorded matter which was recorded by means of MICROSOFT Word 2000, in which a monochrome black solid image (3 cm×3 cm) was recorded, was dried at 23° C.±1° C. and 50% RH±10% RH for 24 hours. Subsequently, JIS L 0803 Cotton No. 3 that had been attached to a CM-1 model clockmeter with a double-sided tape was moved to-and-fro on the recorded matter 5 times so that it was applied to the monochrome black solid image in the recorded matter, and then the density of the cotton cloth to which the ink had been attached was measured with an X-Rite 938. The density of the background color of the cotton cloth was subtracted from the measured density value, and the result was regarded as a density of smeared portions. The density of the smeared portions was judged based on the following evaluation criteria.

[Evaluation Criteria]
 A: lower than 0.15
 B: 0.15 or higher but lower than 0.25
 C: 0.25 or higher described above. Note that as for the results of image quality of recorded matters, the most common evaluation judgment was described as the result. When the number of evaluation judgments was equal, the better judgment was described as the result.

<Evaluation of Liquid Composition Coatability>

A recording medium was coated with the liquid composition using a roll coater. Foaming of the liquid composition in a coating device and coatability of the liquid composition to the recording medium were visually observed, and evaluated based on the following evaluation criteria.

[Evaluation Criteria]
 A: Foaming hardly occurred, and coatability of the liquid composition to the recording medium was good.
 B: Foaming occurred, but antifoaming ability was good, thus, the coatability of the liquid composition to the recording medium was good.
 C: Foaming severely occurred, and the antifoaming ability was poor, thus, coating failure of the liquid composition to the recording medium occurred.

TABLE 8

|  | Image density | Strike-through | Feathering | Color bleeding | White-out | Abrasion resistance | Drying properties | Coatability of liquid composition |
|---|---|---|---|---|---|---|---|---|
| Ex. 1 | B | B | B | A | A | A | A | A |
| Ex. 2 | B | B | B | A | B | A | A | A |
| Ex. 3 | B | B | B | A | B | B | B | A |
| Ex. 4 | A | A | A | A | A | A | A | A |
| Ex. 5 | A | A | A | A | A | A | A | A |
| Ex. 6 | B | A | B | A | A | A | A | A |
| Ex. 7 | A | A | A | A | A | A | A | A |
| Ex. 8 | A | A | A | A | A | A | B | A |
| Ex. 9 | B | A | B | A | A | A | A | A |
| Ex. 10 | B | B | B | A | B | A | B | B |
| Ex. 11 | B | A | B | A | A | A | A | A |
| Ex. 12 | B | A | B | A | A | A | A | A |
| Ex. 13 | B | A | B | A | B | B | A | A |
| Ex. 14 | A | A | A | A | A | A | A | C |
| Comp. Ex. 1 | C | C | B | B | B | B | B | — |
| Comp. Ex. 2 | C | C | C | C | C | A | A | — |
| Comp. Ex. 3 | C | C | C | C | C | A | A | — |
| Comp. Ex. 4 | C | C | C | C | C | A | A | — |
| Comp. Ex. 5 | A | A | A | A | B | C | C | C |
| Comp. Ex. 6 | C | C | B | B | B | B | B | A |

<Drying Properties>

A recorded matter which was recorded by means of MICROSOFT Word 2000, in which a monochrome black solid image (3 cm×3 cm) was produced. Subsequently, immediately after the recording of the image (10 seconds later), JIS L 0803 Cotton No. 3 that had been attached to a CM-1 model clockmeter with a double-sided tape was moved to-and-fro on the recorded matter 5 times so that it was applied to the monochrome black solid image in the recorded matter, and then the density of the cotton cloth to which the ink had been attached was measured by an X-Rite 938. The density of the background color of the cotton cloth was subtracted from the measured density value, and the result was regarded as a density of smeared portions. The density of the smeared portions was judged based on the following evaluation criteria. Note that the evaluation was performed under the environment of 23° C.±1° C. and 50% RH±10% RH.

[Evaluation Criteria]
 A: lower than 0.2
 B: 0.2 or higher but lower than 0.3
 C: 0.3 or higher The evaluation results are shown in Table 8. The inks were evaluated for each color based on the evaluation criteria

REFERENCE SIGNS LIST 1 liquid composition
2 film thickness control roller
3 pump-up roller
4 applying roller
5 counter roller
6 recording medium
7 paper feeding roller
8 paper feeding tray
10 paper feed roller
11 recording medium feed roller
12 recording medium feed roller
13 recording medium feed roller
14 recording medium feed roller
15 recording medium feed roller
16 recording medium feed roller
17 recording medium
18 paper feeding roller
20 recording head
21 ink cartridge
22 carriage shaft 23 carriage
31 recording medium guide
32 recording medium feed roller
33 recording medium feed roller
34 recording medium send-back roller
35 paper feed guide
101 recording medium
102 liquid composition-attached portion
103 negatively charged and colorant-containing particles
104 vehicle

The invention claimed is:

1. A liquid composition comprising:
a water-soluble cationic polymer obtained by polymerizing a monomer comprising an epihalohydrin and at least one selected from the group consisting of an amine and an amide;
a fluorine-based surfactant;
a compound of formula (6):

$$HOR_1R_3C-[CH_2]_n-CR_2R_4OH \quad \text{Formula (6)},$$

wherein $R_1$ and $R_2$ are each independently an alkyl group comprising 3 to 6 carbon atoms;
$R_3$ and $R_4$ are each independently an alkyl group comprising 1 to 2 carbon atoms; and n denotes an integer of from 1 to 6; and
water,
wherein the liquid composition is suitable for agglutinating negatively charged particles dispersed in a dispersion liquid.

2. The liquid composition according to claim 1, further comprising an organic acid ammonium salt.

3. The liquid composition according to claim 2, wherein the organic acid ammonium salt is ammonium lactate.

4. The liquid composition according to claim 1, wherein the water-soluble cationic polymer is at least one selected from the group consisting of:
a copolymer of formula (1):

$$\text{Formula (1)}$$

wherein $R_1$ to $R_8$ are each independently an alkyl group comprising 1 to 8 carbon atoms, a hydroxyalkyl group, an alkenyl group, or a benzyl group,
X is a halogen atom, and
n is an integer of 1 or 2;
a copolymer comprising a repeating unit of formula (2):

$$\text{Formula (2)}$$

wherein X is a halogen atom, and
m is an integer of 1 or more;
a copolymer obtained by polymerizing a monomer of formula (3):

$$H_2N-CH_2-CH_2-NH-CH_2-CH_2-NH_2; \quad \text{Formula (3)}$$

a monomer of formula (4):

$$HO-CO-CH_2-CH_2-CH_2-CH_2-CO-OH; \quad \text{Formula (4)}$$

and
a monomer of formula (5):

$$\text{Formula (5)}$$

wherein X is a halogen atom.

5. The liquid composition according to claim 1, wherein the liquid composition has a surface tension of 30 mN/m or lower.

6. A recording method comprising:
adhering a liquid composition according to claim 1 onto a recording medium; and
adhering a dispersion liquid comprising dispersed negatively charged particles comprising a colorant onto the recording medium.

7. The recording method according to claim 6, wherein the colorant is at least one selected from the group consisting of a self-dispersible pigment, a pigment coated with a resin, and a pigment dispersed by a dispersant.

8. A recorded matter comprising:
an image,
wherein the image is recorded by a recording method, comprising:
adhering a liquid composition according to claim 1 onto a recording medium; and
adhering a dispersion liquid comprising dispersed negatively charged particles comprising a colorant onto the recording medium.

9. The liquid composition according to claim 1, wherein the monomer comprises an amine.

10. The liquid composition according to claim 1, wherein the monomer comprises an amide.

11. The liquid composition according to claim 1, wherein the monomer comprises an amine and an amide.

12. The liquid composition according to claim 1, wherein the water-soluble cationic polymer is 1 to 40 mass percent of the liquid composition.

13. The liquid composition according to claim 1, wherein the water-soluble cationic polymer is 3 to 30 mass percent of the liquid composition.

14. The liquid composition according to claim 2, wherein the organic acid ammonium salt is at least one selected from the group consisting of ammonium lactate, ammonium acetate, ammonium propionate, ammonium citrate, ammonium tartrate, ammonium succinate, diammonium malonate, diammonium hydrogen citrate, triammonium citrate, and ammonium L-glutamate.

15. The liquid composition according to claim 2, wherein the organic acid ammonium salt is 1 to 40 mass percent of the liquid composition.

16. The liquid composition according to claim 2, wherein the organic acid ammonium salt is 3 to 30 mass percent of the liquid composition.

17. The liquid composition according to claim 1, further comprising at least one selected from the group consisting of a penetrant and an anti-foaming agent.

18. The liquid composition according to claim 1,
wherein the fluorine-based surfactant is at least one selected from the group consisting of a perfluoroalkyl sulfonic acid compound, a perfluoroalkyl carboxylic acid compound, a perfluoroalkyl phosphate ester compound, a perfluoroalkylethylene oxide adduct, and a polyoxyalkylene ether polymer compound comprising a perfluoroalkyl ether group in a side chain.

* * * * *